US012553272B2

(12) United States Patent
Lee et al.

(10) Patent No.: US 12,553,272 B2
(45) Date of Patent: Feb. 17, 2026

(54) REFRIGERATOR

(71) Applicant: LG Electronics Inc., Seoul (KR)

(72) Inventors: Heejun Lee, Seoul (KR); Dongjeong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/921,491

(22) Filed: Oct. 21, 2024

(65) Prior Publication Data

US 2025/0043613 A1 Feb. 6, 2025

Related U.S. Application Data

(63) Continuation of application No. 18/233,946, filed on Aug. 15, 2023, now Pat. No. 12,152,428, which is a continuation of application No. 17/939,339, filed on Sep. 7, 2022, now Pat. No. 11,767,702, which is a continuation of application No. 16/608,105, filed as (Continued)

(30) Foreign Application Priority Data

Apr. 24, 2017 (KR) ........................ 10-2017-0052455

(51) Int. Cl.
*F25D 23/02* (2006.01)
*E05F 15/619* (2015.01)
*F25D 29/00* (2006.01)

(52) U.S. Cl.
CPC .......... *E05F 15/619* (2015.01); *F25D 23/028* (2013.01); *F25D 29/005* (2013.01); *E05Y 2201/426* (2013.01); *E05Y 2900/31* (2013.01)

(58) Field of Classification Search
CPC .... E05F 15/619; E05F 15/614; F25D 23/028; F25D 2700/02; F25D 23/02; F25D 2323/02; F25D 2700/04; F25D 29/005; F25D 29/00; F25D 23/063; F25D 23/06; F25D 23/062; F25D 23/065; F25D 29/003; E05Y 2900/31; E05Y 2201/716; E05Y 2201/722; E05Y 2800/266; E05Y 2201/686; E05Y 2201/426
See application file for complete search history.

(56) References Cited

U.S. PATENT DOCUMENTS

2008/0113529 A1* 5/2008 Kim ...................... F25D 29/005 439/76.1
2008/0134698 A1* 6/2008 Cho ...................... F25D 23/028 62/449

(Continued)

*Primary Examiner* — Hiwot E Tefera
(74) *Attorney, Agent, or Firm* — Fish & Richardson P.C.

(57) ABSTRACT

A refrigerator includes: a cabinet; a door rotatably connected to the cabinet by a hinge; and a door opening device for opening the door. The door opening device includes a driving motor and a push member configured to move in the forward/backward direction. The push member includes a first end portion positioned close to the front surface of the cabinet and a second end portion positioned on the opposite side of the first end portion. The cabinet includes a cabinet side wall positioned close to the hinge. The door includes a door side wall positioned close to the hinge. When the door is closed, the horizontal distance between the first end portion and the cabinet side wall or the door side wall is smaller than the horizontal distance between the second end portion and the cabinet side wall or the door side wall.

20 Claims, 25 Drawing Sheets

Related U.S. Application Data application No. PCT/KR2018/004751 on Apr. 24, 2018, now Pat. No. 11,466,498.

(56) References Cited

U.S. PATENT DOCUMENTS

| | | | | |
|---|---|---|---|---|
| 2013/0207527 | A1* | 8/2013 | Heinrich | H05K 5/03 312/223.1 |
| 2016/0116206 | A1* | 4/2016 | Kempfle | F25D 23/028 312/405 |
| 2016/0245579 | A1* | 8/2016 | Eom | E05F 5/02 |
| 2016/0312516 | A1* | 10/2016 | Heydel | E05F 15/614 |
| 2016/0377339 | A1* | 12/2016 | Kempfle | F25D 23/068 312/406 |
| 2017/0336132 | A1* | 11/2017 | Chang | F25D 23/028 |
| 2018/0031312 | A1* | 2/2018 | Kim | F25D 29/008 |
| 2018/0119475 | A1* | 5/2018 | Kim | E05F 15/614 |
| 2018/0187470 | A1* | 7/2018 | Song | F25D 23/087 |
| 2018/0223582 | A1* | 8/2018 | Shin | E05F 15/619 |
| 2018/0283066 | A1* | 10/2018 | Lee | E05F 1/00 |
| 2018/0283077 | A1* | 10/2018 | Lee | E05D 3/16 |
| 2018/0291669 | A1* | 10/2018 | Kim | F25D 23/028 |
| 2018/0347892 | A1* | 12/2018 | Kim | E05F 15/619 |
| 2019/0301228 | A1* | 10/2019 | Yao | E05F 15/619 |
| 2020/0131835 | A1* | 4/2020 | Cheng | E05F 15/619 |

* cited by examiner

REFRIGERATOR

CROSS-REFERENCE TO RELATED APPLICATIONS

This application is a continuation of U.S. application Ser. No. 18/233,946, filed on Aug. 15, 2023, which is a continuation of U.S. application Ser. No. 17/939,339, filed on Sep. 7, 2022, now U.S. Pat. No. 11,767,702, which is a continuation of U.S. application Ser. No. 16/608,105, filed on Oct. 24, 2019, now U.S. Pat. No. 11,466,498, which is a National Stage application under 35 U.S.C. § 371 of International Application No. PCT/KR2018/004751, filed on Apr. 24, 2018, which claims the benefit of Korean Patent Application No. 10-2017-0052455, filed on Apr. 24, 2017. The disclosures of the prior applications are incorporated by reference in their entirety.

TECHNICAL FIELD

The present invention relates to a refrigerator.

BACKGROUND ART

In general, a refrigerator is a home appliance that can keep objects such as food in a storage chamber that is opened or closed by a door at a low temperature.

The storage chamber may be surrounded by an insulation wall such that the internal temperature of the storage chamber is maintained at a temperature lower than an external temperature. The storage chamber may be referred to as a refrigerating compartment or a freezing compartment according to the temperature range of the storage chamber.

The user opens the door in order to put objects into the storage chamber or take objects out of the storage chamber. In some examples, the door is rotatably provided on the cabinet and a gasket is provided between the door and the cabinet.

In some cases, in a state of closing the door, the gasket is closely adhered between the door and the cabinet to prevent leakage of cool air from the storage chamber. As adhesion force of the gasket increases, the effect of preventing leakage of cool air may increase.

In order to increase adhesion force of the gasket, the gasket may be formed of, for example, a rubber magnet or a magnet may be provided in the gasket. However, if adhesion force of the gasket increases, a large force may be required to open the door.

Recently, refrigerators having an auto closing function have been provided.

A method for opening a door of a refrigerator is disclosed in Korean Patent Registration No. 10-1658668 that is a prior art document.

According the prior art document, in order to open the door of the refrigerator, a driving motor rotates to allow the push rod that is gear-coupled to a rotation shaft of the driving motor to advance so as to open the door. Also, when it is confirmed that the push rod reaches a set position, at which the door is opened, by a position detection member configured to detect a position of the push rod, the driving motor reversely rotates so that the push rod returns to its initial position.

Also, the push rod receives driving force generated from the driving motor by a plurality of gears to move.

According to the prior art document, since two push rods operate by using one driving motor, each of the push rods is disposed at a position far from a hinge of the door to smoothly receive power of the driving motor. That is, each of the push rods are disposed adjacent to a boundary of two doors that are adjacent to each other.

Thus, when the door is opened by using the push rod, there is a disadvantage that an opening angle of the door per unit length of the push rod is low. Thus, in order to increase in opening angle of the door, the push rod has to increase in length. In this case, a portion of the push rod, which is exposed to the outside, is lengthened, which cause deterioration of aesthetics.

Also, there is a limitation when a user closes the door after increasing in opening angle of the door before or after the push rod advances to move to the set position. In detail, an impact caused by emergency return of the door is transmitted to the plurality of gears through the push rod, and thus, the push rods and/or the gears are damaged.

DISCLOSURE OF THE INVENTION

Technical Problem

An object of the prevent invention is to provide a refrigerator in which an opening angle of a door per unit length of a push member increases while the push member increases in length so as to increase in opening angle of the door.

Also, an object of the present invention is to provide a refrigerator in which a push member is capable of urgently returning to detect whether door is opened by external force and prevent the push member from being damaged.

Technical Solution

A refrigerator according on one aspect includes a cabinet having a storage chamber; a door configured to open and close the storage chamber, the door being rotatably connected to the cabinet by a hinge; and a door opening device configured to open the door.

The door opening device includes a driving motor and a push member configured to receive power of the driving motor to move forward and backward.

The push member includes a first end portion disposed close to a front surface of the cabinet and a second end portion disposed at an opposite side of the first end portion.

The cabinet includes a cabinet sidewall disposed close to the hinge, and the door includes a door sidewall disposed close to the hinge.

In a state in which the door is closed, a horizontal distance between the cabinet sidewall or the door sidewall and the first end portion may be less than that between the cabinet sidewall or the door sidewall and the second end portion.

When the push member moves to open the door, the first end portion and the second end portion may move to approach the cabinet sidewall or the door sidewall.

A length between the first end portion and the second end portion of the push member may be greater than a thickness of the door in a front and rear direction.

The push member may include a push rack comprising a rack gear configured to receive the power of the driving motor, the push rack may include a first side surface and a second side surface, the first side surface may be disposed closer to the cabinet sidewall or the door sidewall than the second side surface, and the rack gear may be disposed on the first side surface.

The push rack may further include a top surface and a bottom surface, a groove may be defined in one or more of the top surface and the bottom surface, and the groove may be disposed closer to the first side surface than the second side surface.

The driving motor may be disposed in a region between the first side surface and the cabinet sidewall.

The door opening device may be installed on an installation bracket provided in the cabinet, the installation bracket may include a wire guide configured to guide a wire connected to the door, and the driving motor may be disposed behind the wire guide.

The push member may further include: a push rack including a rack gear configured to receive power of the driving motor; and a rack cover rotatably connected to the push rack while the door is opened, the rack cover being configured to contact a front surface of the cabinet or a rear surface of the door.

The push rack may include a first side surface, a second side surface, and a connection surface configured to connect the first side surface to the second side surface, and a cover coupling part coupled to the rack cover may be disposed on the connection surface.

The rack cover and the cover coupling part may be relatively rotatably coupled to each other by a shaft.

The cover coupling part may protrude from the connection surface, the cover coupling part may be spaced apart from each of top and bottom surfaces of the push rack, the rack cover may include a contact surface configured to contact the cabinet or the door and a slot surface that is an opposite surface of the contact surface, and a slot, into which the cover coupling part is accommodated, may be defined in the slot surface.

The connection surface may include an inclined surface that is spaced apart from the slot surface of the rack cover in a state in which the contact surface is disposed to face the front surface of the cabinet or the rear surface of the door at an initial position of the push member in the state in which the door is closed.

When an opening angle of the door increases while the push member moves to open the door, the push rack and the rack cover may relatively rotate so that the inclined surface contacts the slot surface.

The refrigerator may further include: a magnetic field generation device installed in the door opening device; and a reed switch assembly configured to operate by the magnetic field generation device.

One of the magnetic field generation device and the reed switch assembly may be disposed in the cabinet, and the other is disposed in the door.

For example, the magnetic field generation device may be installed in the push member.

In the door opening device, the push member may be disposed in the cabinet to move toward the door, and the reed switch assembly may be disposed on the door adjacent to the push member.

The reed switch assembly may include a pair of reeds disposed to contact each other by the magnetic field generation device.

When one end of the push member is separated from the door, the pair of reeds may be spaced apart from each other.

When the pair of reeds are spaced apart from each other, the refrigerator may further include a controller that controls the motor so that the push member is inserted into or returns to the initial position.

The push member may include a linear push rack having a rack gear on one side thereof.

For another example, in the door opening device, the push member may be disposed in the door to move toward the cabinet, and the reed switch assembly may be disposed on the cabinet adjacent to the push member.

The push member may include a rack cover disposed to be exposed to the outside of the cabinet, and the magnetic field generation device may be disposed on the rack cover.

The reed switch assembly may be disposed adjacent to the rack cover to recognize magnetic fields generated by the magnetic field generation device.

The reed switch assembly may include a pair of reeds. When the door rotates by the door opening device, the pair of reeds contact each other by the magnetic field generation device, and when the door rotates by external force, the pair of reeds may be spaced apart from each other.

The magnetic field generation device may be a magnet.

A refrigerator according to another aspect includes: a cabinet having at least one storage chamber therein; a door disposed at one side of the cabinet to open and close the storage chamber; a door opening device configured to operate so that the storage chamber is opened by driving force of a motor; a magnetic field generation device installed in the door opening device; and a reed switch assembly configured to operate by the magnetic field generation device, wherein one of the magnetic field generation device and the reed switch assembly is disposed in the cabinet, and the other is disposed in the door.

Advantageous Effects

According to the proposed embodiments, the opening angle of the door per unit length of the push member may increase while the push member increases in length so as to increase in opening angle of the door.

Also, according to the present invention, the push member may urgently return to detect whether door is opened by the external force and prevent the push member from being damaged.

Also, when the door opening device is installed in the cabinet, the structure configured to couple the door opening device to the outer case may not be directly provided, but the door opening device may be installed on the installation bracket after the installation bracket is coupled to the outer case.

Therefore, the position of the door opening device may be fixed with respect to the cabinet without changing the structure of the mold configured to manufacture the outer case according to the related art.

MODE FOR CARRYING OUT THE INVENTION

Figure 1:
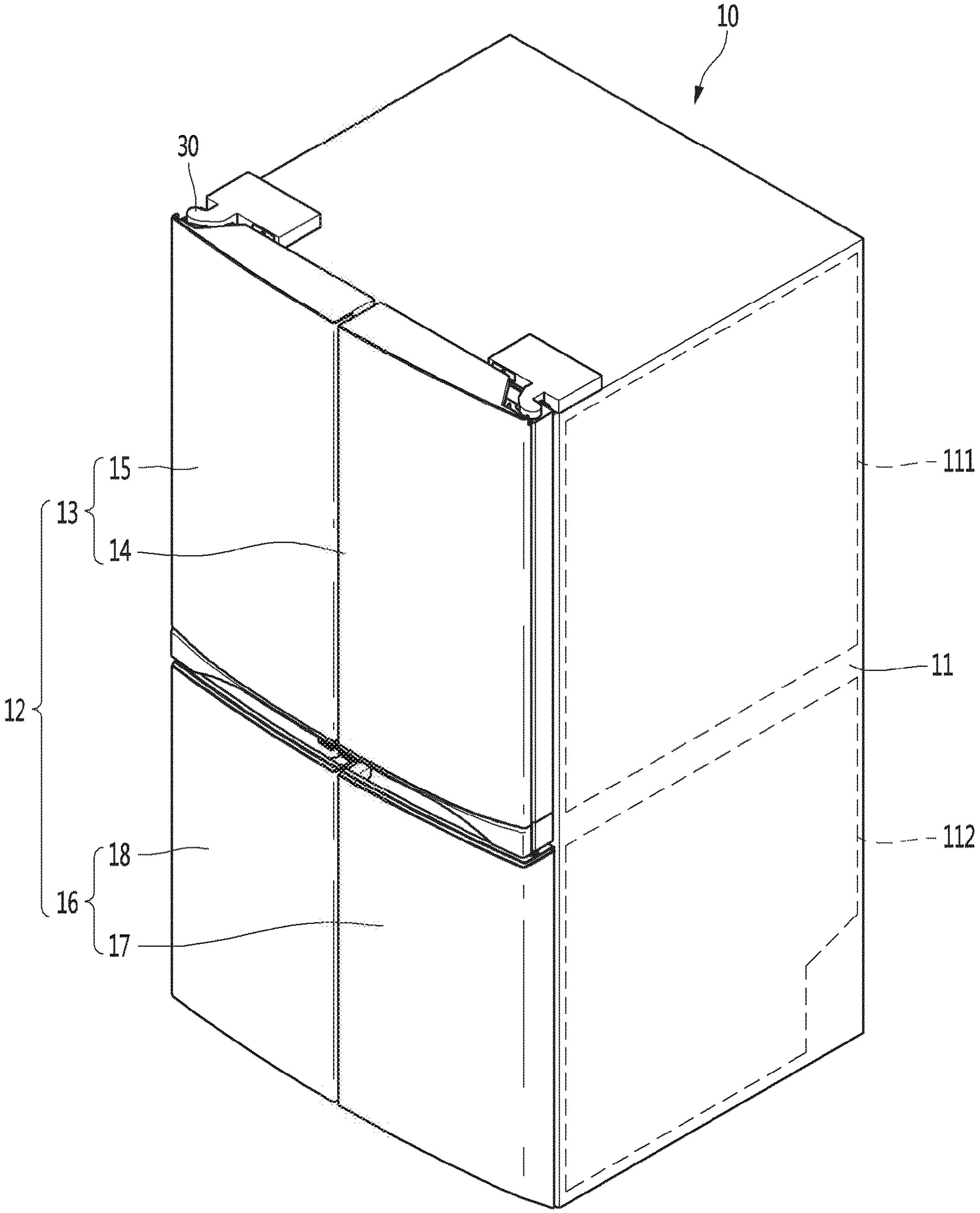
FIG. 1 is a perspective view of a refrigerator according to a first embodiment of the present invention.

Hereinafter, some embodiments of the present invention will be described in detail with reference to the accompanying drawings. Exemplary embodiments of the present invention will be described below in more detail with reference to the accompanying drawings. It is noted that the same or similar components in the drawings are designated by the same reference numerals as far as possible even if they are shown in different drawings. In the following description of the present invention, a detailed description of known functions and configurations incorporated herein will be omitted to avoid making the subject matter of the present invention unclear.

In the description of the elements of the present disclosure, the terms first, second, A, B, (a), and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

FIG. 1 is a perspective view of a refrigerator according to a first embodiment of the present invention.

Referring to FIG. 1, a refrigerator 10 according to an embodiment of the present invention may include a cabinet 11 and at least one refrigerator door 12, which define an outer appearance thereof.

At least one storage chamber is provided in the cabinet 11. The refrigerator door 12 is rotatably and slidably connected to a front surface of the cabinet 11 to open and close the storage chamber. Here, since a user uses the refrigerator 10 in front of the refrigerator 10, the refrigerator door 12 may be disposed in front of the cabinet 11.

In detail, the storage chamber may include at least one of the refrigerating compartment 111 or the freezing compartment 112. Although the storage chamber includes one refrigerating compartment 111 and on freezing compartment 112 in FIG. 1, this is merely an example, and the refrigerating compartment 111 and the freezing compartment 112 may be provided in plurality. Also, the refrigerating compartment 111 and the freezing compartment 112 may be partitioned by a partition wall. Alternatively, the storage chamber may include only one of the refrigerating compartment 111 and the freezing compartment 112.

The refrigerator door 12 may include at least one refrigerating compartment door 13 that opens and closes the refrigerating compartment 111, and at least one freezing compartment door 16 that opens and closes the freezing compartment 112.

Also, the refrigerator door 12 may be a pivotable door provided to be rotatable through a door hinge 30. That is, the refrigerator door 12 may rotate with respect to the cabinet 11 through the door hinge 30.

Also, the refrigerating compartment door 13 may include a pair of doors 14 and 15, which are rotatably connected to left and right edges of the front surface of the cabinet 11, respectively. That is, the refrigerating compartment door 13 may include a first refrigerating compartment door 14 and a second refrigerating compartment door 15.

Also, the freezing compartment door 16 may include a pair of doors 17 and 18, which are rotatably connected to left and right edges of the front surface of the cabinet 11, respectively.

This is merely an example. For example, each of the refrigerating compartment door 13 and the freezing compartment door 16 may be provided in various forms such as a drawer type door that opens and closes the freezing compartment in a sliding manner.

Also, as illustrated in FIG. 1, in this embodiment, a bottom freezer type refrigerator is disclosed. However, this is merely an example. For example, the refrigerator 10 may be provided in various forms such as a top mount type refrigerator, a side by side type refrigerator, a refrigerator having only one storage chamber and one door, and the like.

Figure 2:
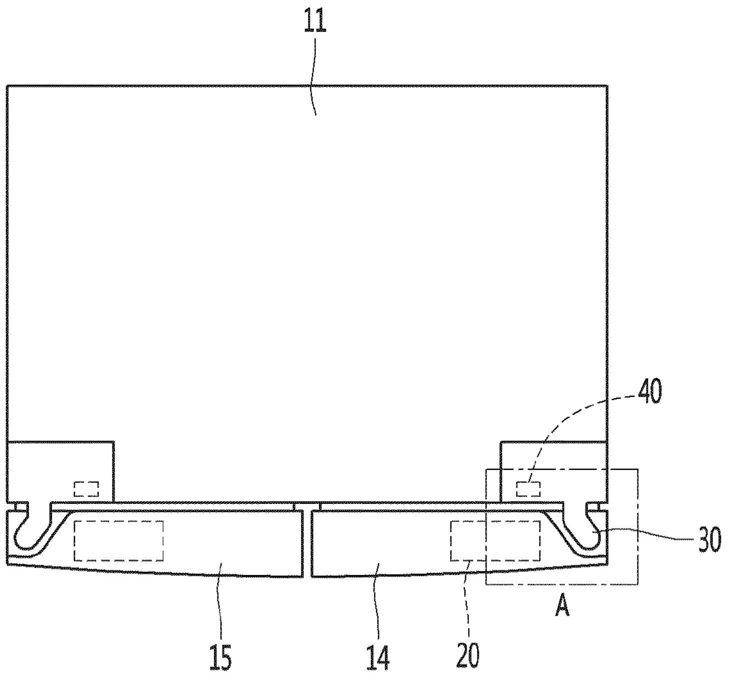
FIG. 2 is a plan view of the refrigerator according to the first embodiment.

FIG. 2 is a plan view of the refrigerator according to the first embodiment.

Referring to FIG. 2, the refrigerator 10 may further include a door opening device 20 that operates to open the refrigerator door 12 without external force by the user.

That is, the refrigerator 10 may include a door opening device 20 that is capable of automatically opening the refrigerator door 12.

Also, the door opening device 20 may open each of the refrigerator doors 12 that need to be opened. For example, in order to open the refrigerating compartment door 13, the door opening device 20 may open each of a first refrigerating compartment door 14 and a second refrigerating compartment door 15.

Hereinafter, a case in which the first refrigerating compartment door 14 of the refrigerator door 12 is automatically opened by the door opening device 20 will be described. In addition to the first refrigerating compartment door 14, other refrigerator doors 12 may also be automatically opened by a structure and manner that will be described below.

As described above, the first refrigerating compartment door 14 is connected to the cabinet 11 by the door hinge 30.

That is, the first refrigerating compartment door 14 may rotate by using a hinge shaft 32 (see FIG. 3) provided on the door hinge 30 as a rotational center.

As illustrated in FIG. 2, the door opening device 20 may be installed in the first refrigerating compartment door 14.

Also, FIG. 2 illustrates a top surface of the refrigerator 10 so as to show a case in which the door opening device 20 is installed in an upper portion of the first refrigerating compartment door 14. This is merely an example. For example, the door opening device 20 may be installed in a lower portion of the first refrigerating compartment door 14.

Hereinafter, various devices, which automatically open the first refrigerating compartment door 14, such as the door opening device 20 will be described in detail.

Figure 3:
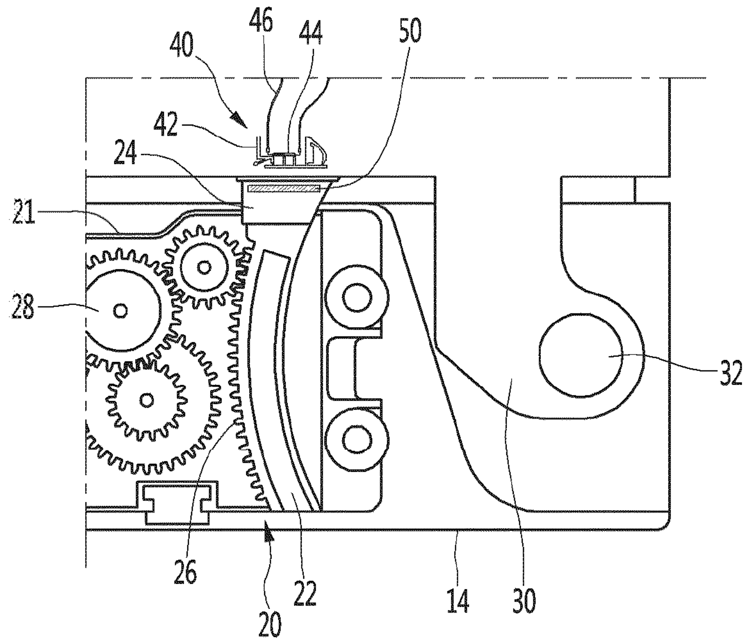
FIG. 3 is an enlarged view of a portion A of FIG. 2.
Figure 4:
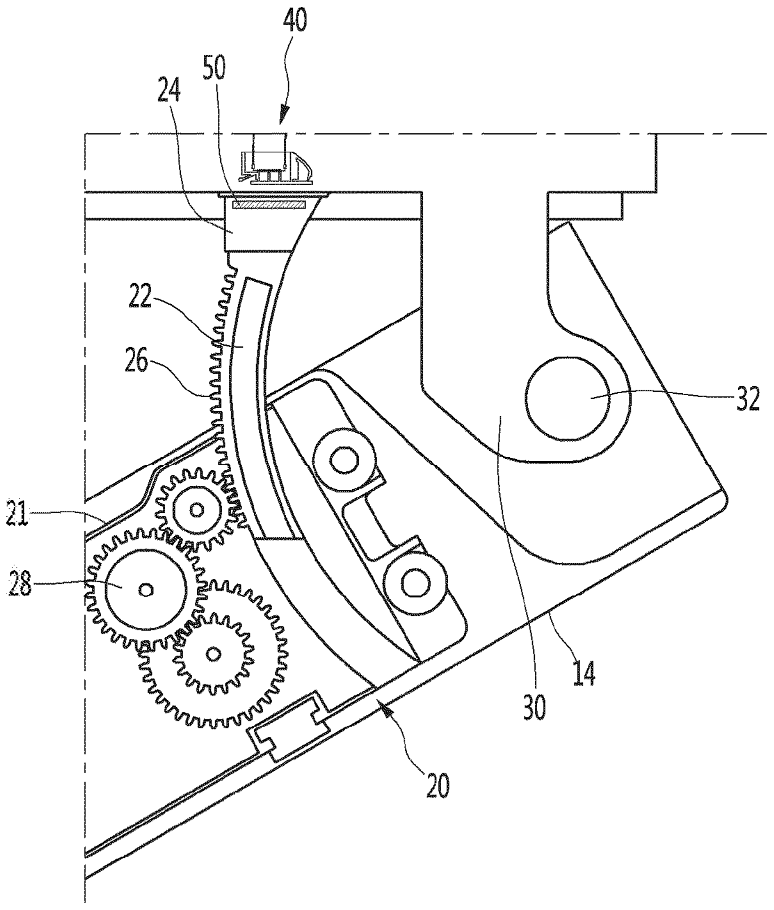
FIG. 4 is a view illustrating a state in which a door rotates in FIG. 3.

FIG. 3 is an enlarged view of a portion A of FIG. 2, and FIG. 4 is a view illustrating a state in which the door rotates in FIG. 3. Hereinafter, the first refrigerator door 14 is referred to as a 'door'. Also, in order to illustrate the door opening device 20 and the like in detail, an upper configuration of the door opening device 20 and the like, for example, an upper cap of the door 14 will be omitted.

Referring to FIGS. 3 and 4, the door opening device 20 may be disposed in the upper portion of the door 14.

The door 14 may be provided with a predetermined space in which the door opening device 20 is accommodated.

The door opening device 20 includes a housing 21 and a motor (not shown) and a push member 22, which are installed in the housing 21. The push member 22 is installed to be withdrawn from and inserted into the housing 21 by driving force of the motor.

Also, the door opening device 20 may further include a power transmission device 28 that transmits the driving force of the motor to the push member 22. That is, the driving force of the motor is transmitted to the push member 22 through the power transmission device 28. Thus, the push member 22 is withdrawn from the housing 21 by the driving of the motor in one direction and is inserted into the housing 21 the housing 21 by the driving of the motor in the other direction.

In FIG. 3, the push member 22 is inserted into the housing 21, and in FIG. 4, a push rack 22 is withdrawn from the housing 21. As illustrated in FIG. 3, a portion of the push member 22 may protrude to the outside of the housing 21 in a state in which the push member 22 is inserted into the housing 21.

The power transmission device 28 may include at least one gear. In the present invention, the number of gears is not limited as long as the power transmission device 28 is capable of transmitting the power of the motor to the push member 22. For example, the power transmission device 28 may include a plurality of reduction gears.

The push member 22 includes a rack gear 26 engaged with at least one power transmission device 28. The driving force of the motor is transmitted to the push member 22 through the engagement between the power transmission device 28 and the rack gear 26.

The push member 22 may be provided in a curved shape so that an opening angle of the door 14 per unit length increases and also be provided in an arc shape around the hinge shaft 32 of the door hinge 30.

Also, the push member 22 may be disposed adjacent to the hinge shaft 32 so that the opening angle of the door 14 per unit length increases.

That is, in the door 14, the push member 22 is disposed close to the a first side surface between the first side surface adjacent to the hinge shaft 32 and a second side surface adjacent to the other door as an opposite surface of the first surface.

Also, the push member 22 may include a rack cover 24 coupled to a distal end thereof. As illustrated in FIGS. 3 and 4, the rack cover 24 is disposed to contact the front surface of the cabinet 11. This is merely an example. For example, the rack cover 24 may be disposed to be spaced a predetermined distance from the cabinet 11.

That is, as a length by which the push member 22 is withdrawn to the outside of the housing 21 increases, the rack cover 24 contacts the front surface of the cabinet 11 to apply force to the cabinet 11. Accordingly, the cabinet 11 and the door 14 may be separated from each other, and the storage chamber may be opened.

The rack cover 24 may be made of an elastic material because the rack cover 24 contacts the cabinet 11. For example, the cabinet 11 may be made of a material that is elastically deformable, such as a rubber material or a silicon material, to prevent the breakage when external force is applied to the cabinet 11.

A process of automatically opening the storage chamber by the rotation of the door 14 due to the driving of the door opening device 20 will be described.

First, an opening signal that is required for opening the storage chamber is generated. For example, a signal may be generated through a voice or a human body sensor. That is, the user may generate the opening signal by recognizing the voice or a relatively free foot to the sensor while holding an object in both hands thereof.

When the opening signal is generated, the motor is driven to transmit the driving force to the push member 22 through the power transmission device 28. The push member 22 is withdrawn to the outside of the housing 21 by the driving force.

Accordingly, the rack cover 24 applies external force to the cabinet 11, and thus, the door 14 rotates. That is, while the state of FIG. 3 is changed into the state of FIG. 4, the door 14 opens the storage chamber provided in the cabinet 11.

Therefore, the user may approach the storage chamber without applying the external force to take out food or inject food into the storage chamber.

Here, the door opening device 20 is provided to allow the door 14 to rotate at a predetermined angle and up to a predetermined position (hereinafter, opening position). For example, the door opening device 20 may allow the door 14 to rotate so that the door 14 is in the opening position having an opening angle of approximately 40 degrees.

Also, in the door opening device 20, after a predetermined time is elapsed, the motor of the door opening device 20 may be driven in the other direction, and thus, the push member 22 may be inserted into the housing 21.

That is, the motor is driven so that the push member 22 returns to the housing 21. The door 14 in which the external force by the push member 22 is removed may rotate by a self-weight of the refrigerator 10 to close the storage chamber.

This corresponds to a case in which the user does not apply external force at all to the door 14. However, in some cases, the user may apply external force to the door 14 so that the door 14 rotates.

For example, while the door 14 rotate by the door opening device 20, that is, before the door 14 reaches a predetermined opening position, the user applies external force so that the door 14 rotates to open the storage chamber.

Alternatively, the user applies external force to the door 14 that rotates by the door opening device 20 so that the door 14 further rotates at a predetermined angle.

Here, the user may apply external force again to allow the door to rotate so as to close the storage chamber by the door 14. In this case, if the push member 22 is in the withdrawn state, the door opening device 20 such as the push member 22 and the power transmission device 28 may be damaged.

Therefore, the refrigerator 10 according to the present invention may further include a part for detecting the case when the user applies the external force to the door 14 so that the door 14 rotates.

For example, the refrigerator 10 may further include a magnetic field generation device 50 and a reed switch assembly 40 that operates by the magnetic field generation device 50.

The reed switch assembly 40 may include a case 42, a sensor 44, and a wire 46.

The case 42 is provided with an inner space in which the sensor 44 is accommodated. Also, the case 42 may be provided with a constituent that supports or fixes the sensor 44.

The sensor 44 is constituted by a container defining a predetermined accommodation space and a reed disposed inside the container. The reeds are provided in a pair that are spaced apart from each other by their elasticity, When magnetic fields are detected, the reeds contacts each other. That is, the reeds may be made of a magnetic material and thus may contact each other only when the magnetic fields are detected.

The wire 46 is connected to the sensor 44 to extend to the outside of the case 42. In particular, the wire 46 is coupled to each of the pair of reeds. For example, the wire 46 and the reed may be bonded to each other through soldering or the like.

The wire 46 may extend to the outside of the case 42 so as to be connected to the controller. For example, the wire 46 may extend to the hinge shaft 32.

The magnetic field generation device 50 may be provided as a magnet. For example, the magnetic field generation device 50 may be provided as a plurality of magnets having different polarities to generate the magnetic fields.

The magnetic field generation device 50 may be installed in the door opening device 20. For example, the magnetic field generation device 50 may be installed at one end of the push member 22, i.e., the rack cover 24.

As illustrated in FIG. 3, the magnetic field generation device 50 is installed in the rack cover 24, and the reed switch assembly 40 is installed in the cabinet 11 adjacent to the rack cover 24.

That is, the magnetic field generation device 50 is installed in the door 14, and the reed switch assembly 40 is installed in the cabinet 11. However, since the magnetic field generation device 50 is installed in the rack cover 24 contacting the cabinet 11, the magnetic field generation device 50 and the reed switch assembly 40 are adjacent to each other.

Thus, the reed switch assembly 40 may recognize the magnetic fields generated by the magnetic field generation device 50. That is, the pair of reeds of the reed switch assembly 40 are connected to each other by the magnetic field generation device 50.

As illustrated in FIG. 4, when the door 14 rotates by the door opening device 20, the pair of reeds of the reed switch assembly 40 is continuously maintained in the connected state by the magnetic field generation device 50.

However, when the door 14 rotates by the user, the rack cover 24 and the cabinet 11 is separated from each other. That is, the magnetic field generation device 50 and the reed switch assembly 40 are away from each other. Thus, the pair of reeds of the reed switch assembly 40 do not recognize the magnetic fields and thus are spaced apart from each other by their elasticity.

The separation of the pair of reeds is transmitted to the controller through the wire 44. Thus, the controller determines that the user has opened the door 14 by applying the external force, and then drives the motor so that the push member 22 is inserted into the housing 21.

In summary, whether the user applies the external force to allow the door 14 to rotate may be recognized through the magnetic field generation device 50 installed in the rack cover 24 and the reed switch assembly 40 installed in the cabinet 11. When it is determined that the user has opened the door 14 by applying the external force, the motor may be driven to insert the push member 22 into the housing 21, thereby preventing the door opening device 20 from being damaged.

In the above, the case in which the magnetic field generation device 50 is installed in the door 14, and the reed switch assembly 40 is installed in the cabinet 11 has been described. However, the above-described operation may be performed in all of cases in which one of the magnetic field generation device 50 and the reed switch assembly 40 may be disposed in the cabinet 11, and the other is disposed in the door 14.

That is, even when the door opening device 20 is installed in the cabinet 11, and the reed switch assembly 40 is installed in the door 14, the same operation may be performed.

Hereinafter, the refrigerator according to this embodiment will be referred to as a refrigerator according to a second embodiment and will be described in detail. Also, the same reference numerals are used for the same components as those described above, and only the differences will be described.

Figure 5:
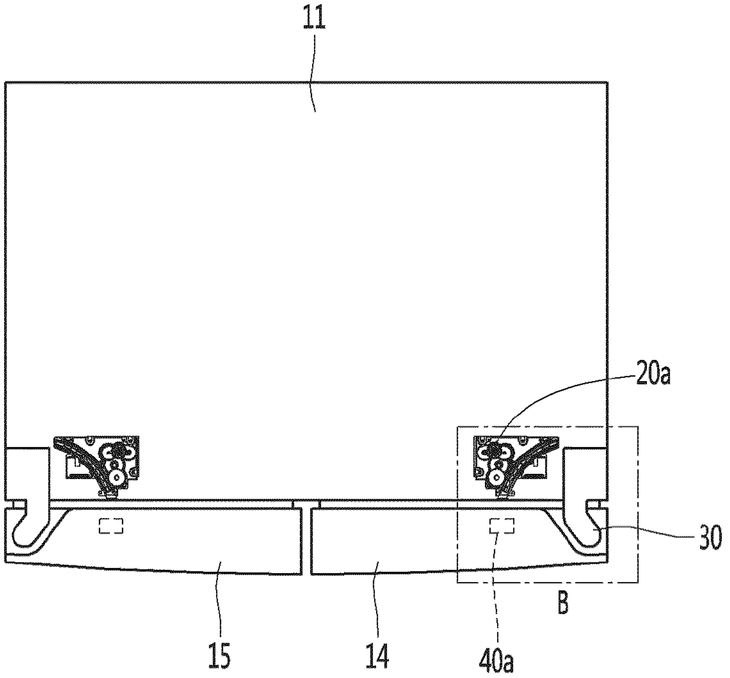
FIG. 5 is a plan view of a refrigerator according to a second embodiment.
Figure 6:
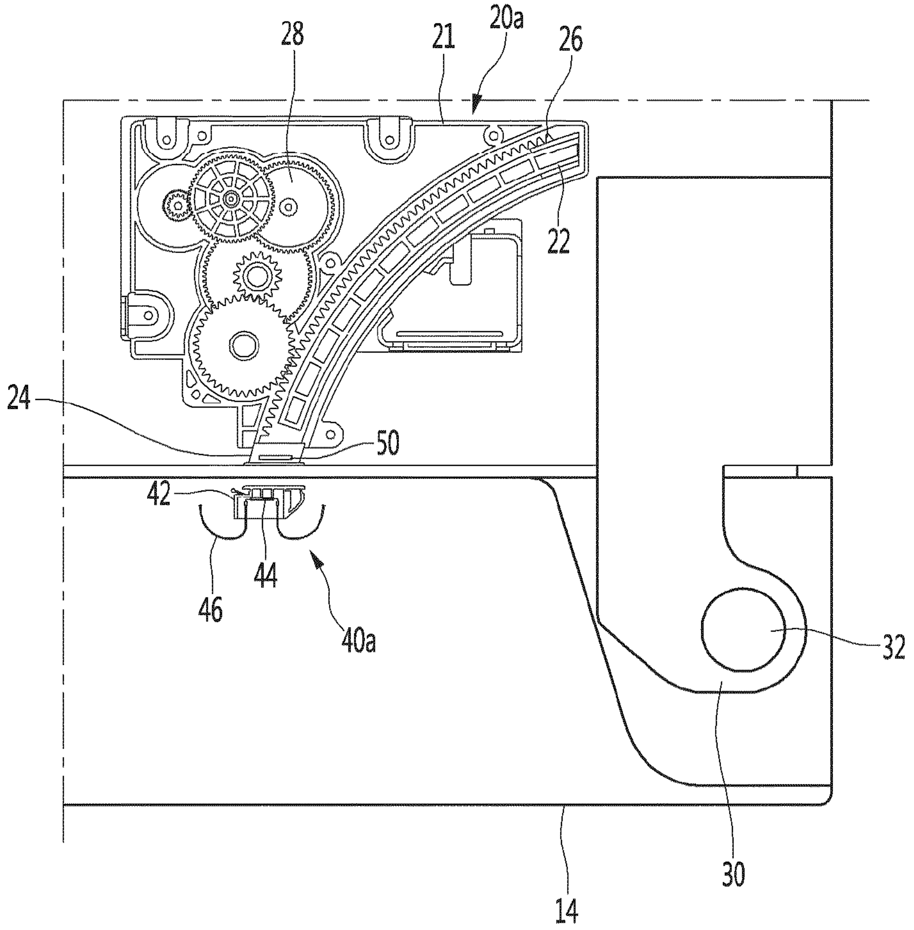
FIG. 6 is an enlarged view of a portion B of FIG. 5.
Figure 7:
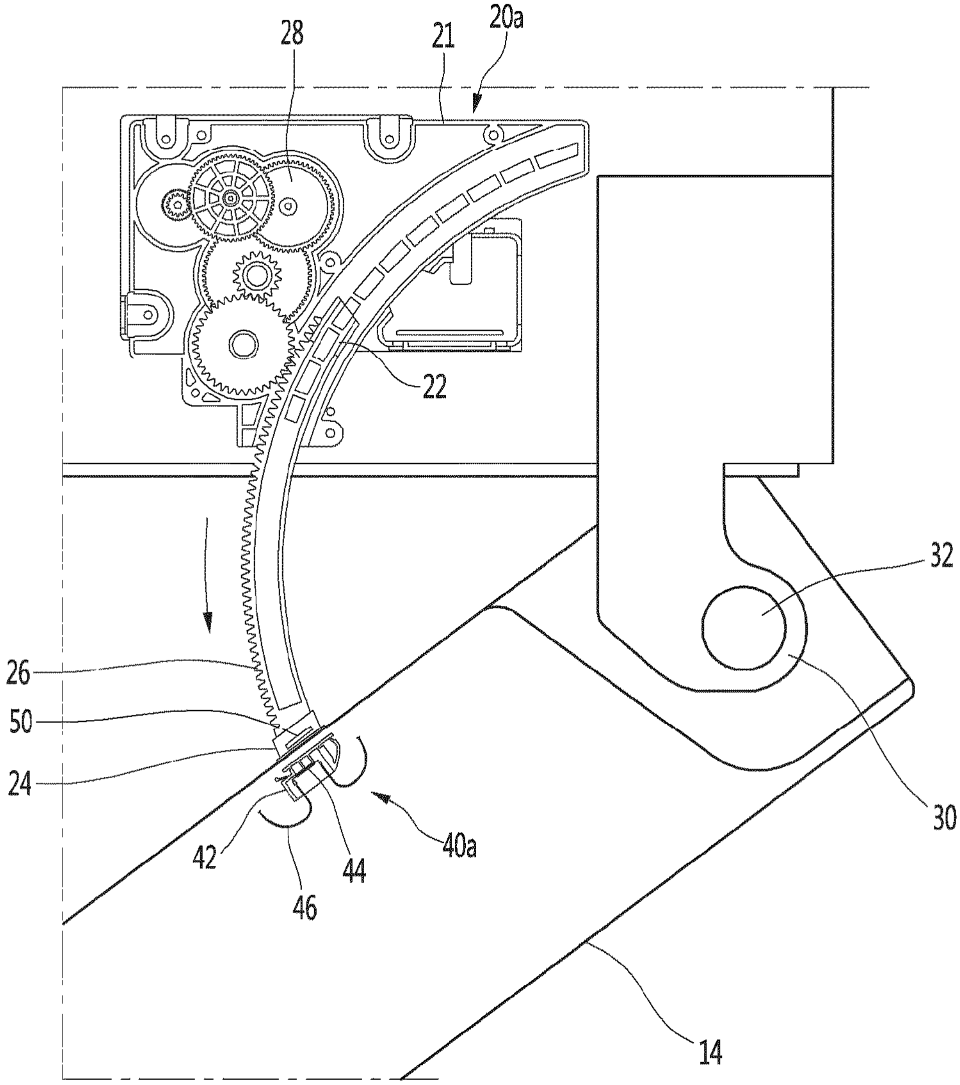
FIG. 7 is a view illustrating a state in which a door rotates in FIG. 6.

FIG. 5 is a plan view of a refrigerator according to a second embodiment, FIG. 6 is an enlarged view of a portion B of FIG. 5, and FIG. 7 is a view illustrating a state in which a door rotates in FIG. 6.

Referring to FIGS. 5 to 7, a door opening device **20*a* according to this embodiment may be installed in a cabinet 11. FIG. 5 illustrates a top surface of a refrigerator 10 so as to show a case in which the door opening device 20*a* is installed in an upper portion of a first refrigerating compartment door 11. This is merely an example. For example, the door opening device 20*a* may be installed in a lower portion of the cabinet 11**.

Hereinafter, the first refrigerator door 14 is referred to as a 'door'. Also, in order to illustrate the door opening device **20*a* and the like in detail, an upper configuration of the door opening device 20*a* and the like, for example, upper caps of the door 14 and the cabinet 11** will be omitted.

The door opening device **20*a* may include a housing 21 and a motor (not shown), a push member 22, and a power transmission device 28, which are installed in the housing 21**.

The push member 22 is installed to be withdrawn from and inserted into the housing 21 by driving force of the motor.

As the push member 22 is withdrawn to the outside of the housing 21, a rack cover 24 applies external force to the door 14. Accordingly, the cabinet 11 and the door 14 may be separated from each other, and the storage chamber may be opened.

Also, the refrigerator 10 may include a magnetic field generation device 50 and a reed switch assembly 40*a* that operates by the magnetic field generation device 50.

The reed switch assembly 40*a* may include a case 42, a sensor 44, and a wire 46.

As illustrated in FIGS. 6 and 7, the magnetic field generation device 50 is installed in the rack cover 24, and the reed switch assembly 40*a* is installed in the door 14 adjacent to the rack cover 24.

That is, the magnetic field generation device 50 is installed in the cabinet 11, and the reed switch assembly 40*a* is installed in the door 14. However, since the magnetic field generation device 50 is installed in the rack cover 24 contacting the door 14, the magnetic field generation device 50 and the reed switch assembly 40*a* are adjacent to each other.

As illustrated in FIG. 7, when the door 14 rotates by the door opening device 20*a*, the pair of reeds of the reed switch assembly 40*a* is continuously maintained in the connected state by the magnetic field generation device 50.

However, when the door 14 rotates by the user, the rack cover 24 and the cabinet 11 is separated from each other. That is, the magnetic field generation device 50 and the reed switch assembly 40*a* are away from each other. Thus, the pair of reeds of the reed switch assembly 40*a* do not recognize the magnetic fields and thus are spaced apart from each other by their elasticity.

The separation of the pair of reeds is transmitted to the controller through the wire 44. Thus, the controller determines that the user has opened the door 14 by applying the external force, and then allows the push member 22 to return to the housing 21.

In the first and second embodiments, embodiments in which the door opening device and the magnetic field generation device are different in the same refrigerator have been described. Hereinafter, in a third embodiment, a refrigerator and door opening device having a different shape will be described.

Figure 8:
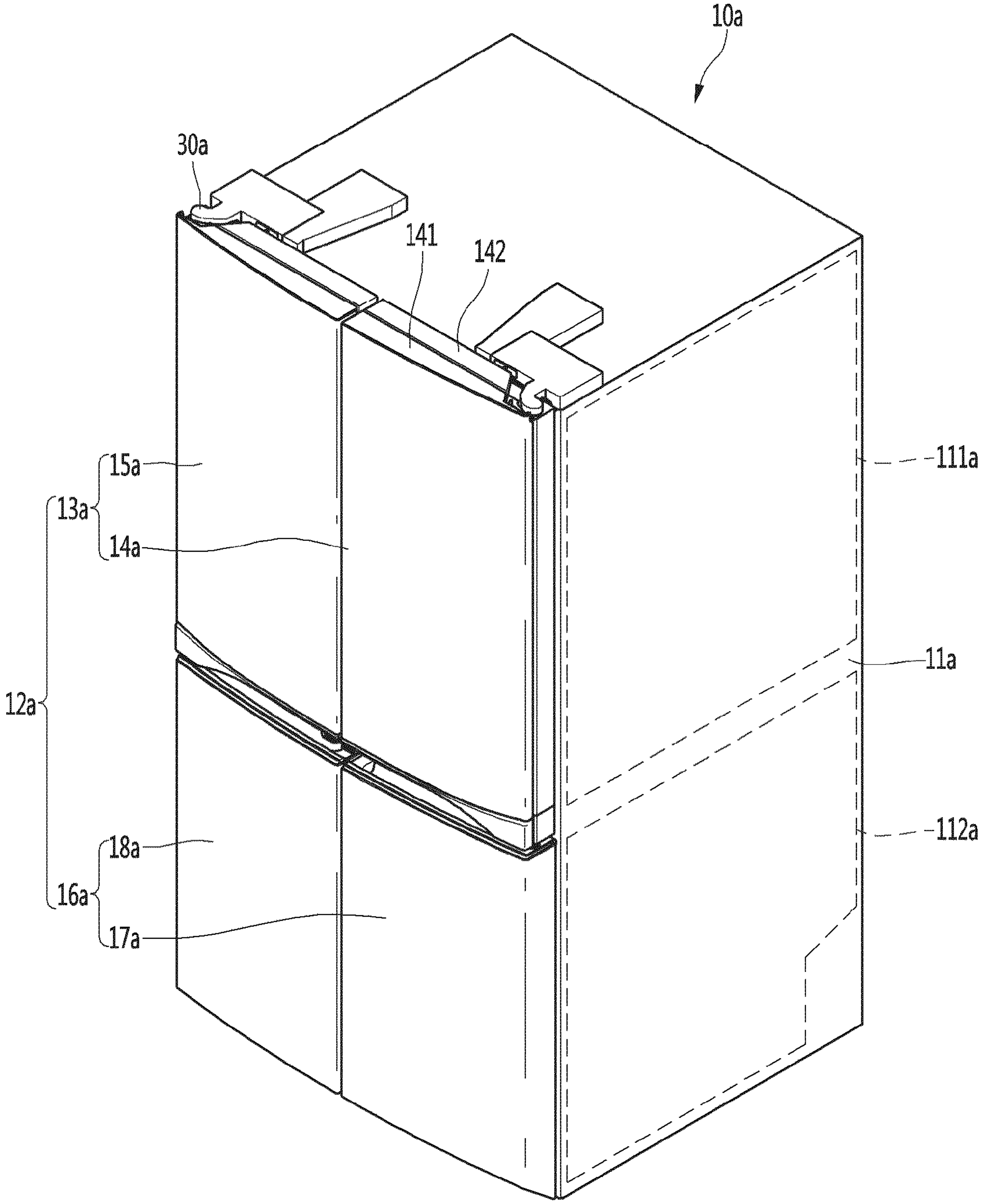
FIG. 8 is a perspective view of a refrigerator according to a third embodiment of the present invention.
Figure 9:
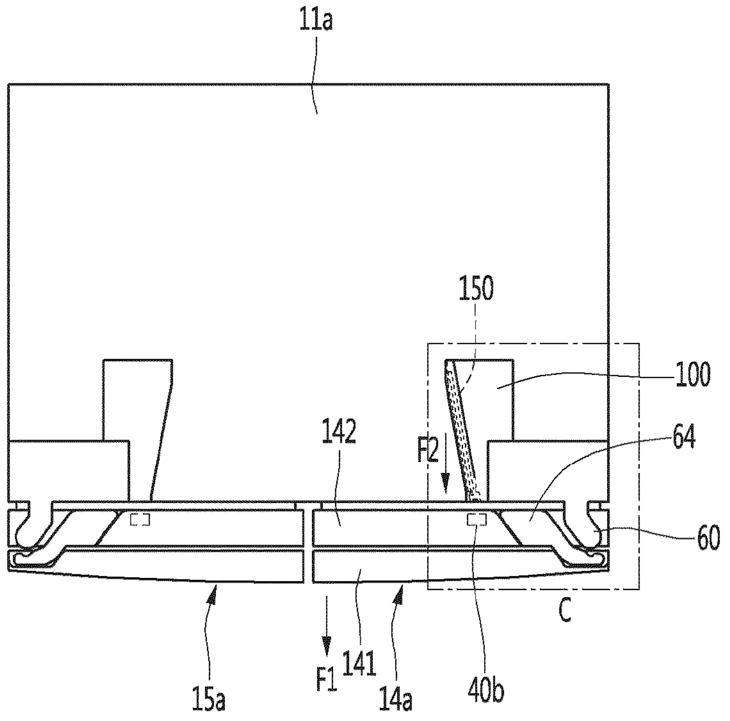
FIG. 9 is a plan view of the refrigerator according to the third embodiment.

FIG. 8 is a perspective view of a refrigerator according to a third embodiment of the present invention, and FIG. 9 is a plan view of the refrigerator according to the third embodiment.

Referring to FIGS. 8 and 9, a refrigerator 10*a* according to this embodiment may include a cabinet 11*a* having a storage chamber and a refrigerator door 12*a* that opens and closes the storage chamber.

The storage chamber may include one or more of a refrigerating compartment 111*a* and a freezing compartment 112*a*.

The refrigerator door 12*a* may include one or more of a refrigerating compartment door 13*a* that opens and closes the refrigerating compartment 111*a* and a freezing compartment door 16*a* that opens and closes the freezing compartment 112*a*.

Also, the refrigerating compartment door 13*a* may include a first refrigerating compartment door 14*a* and a second refrigerating compartment door 15*a*. Also, the freezing compartment door 16*a* may include a pair of doors 17*a* and 18*a*.

Hereinafter, the first refrigerator door 14*a* will be described as an example and will be referred to as a 'door'.

The door 14*a* may include an inner door 142 contacting a front surface 113*a* of the cabinet 11*a* and an outer door 141 disposed on a front surface of the inner door 142.

That is, the cabinet 11*a*, the inner door 142, and the outer door 141 may be sequentially arranged.

A separate accommodation space, which is separated from the storage chamber, may be defined between the inner door 142 and the outer door 141.

Also, the door 14*a* may be a pivotable door that is provided to be rotatable through a first hinge 60. Also, the outer door 141 is rotatably connected to the inner door 142 through a second hinge 64.

That is, the first hinge 60 is provided to connect the inner door 142 to the cabinet 11, and the second hinge 64 is provided to connect the inner door 142 to the outer door 141.

The door 14*a* including the inner door 142 and the outer door 141 rotates about a hinge shaft 62 of the first hinge 60 to open the storage chamber.

Also, the refrigerator 10*a* may include various devices that automatically open the door 14*a* such as a door opening device 100 and a reed switch assembly 40*b*.

Here, the door opening device 100 allows the door 14*a* including the inner door 142 and the outer door 141 to rotate about the hinge shaft 62 of the first hinge 60.

As described above, the door opening device 100 may be installed in the cabinet 11*a*, and the reed switch assembly 40*b* may be installed in the door 14*a*.

Since the cabinet 11*a* has an area greater than that of the door 14*a*, when the door opening device 20*a* is installed in the cabinet 11*a*, a spatial limitation may be relatively less.

Figure 10:
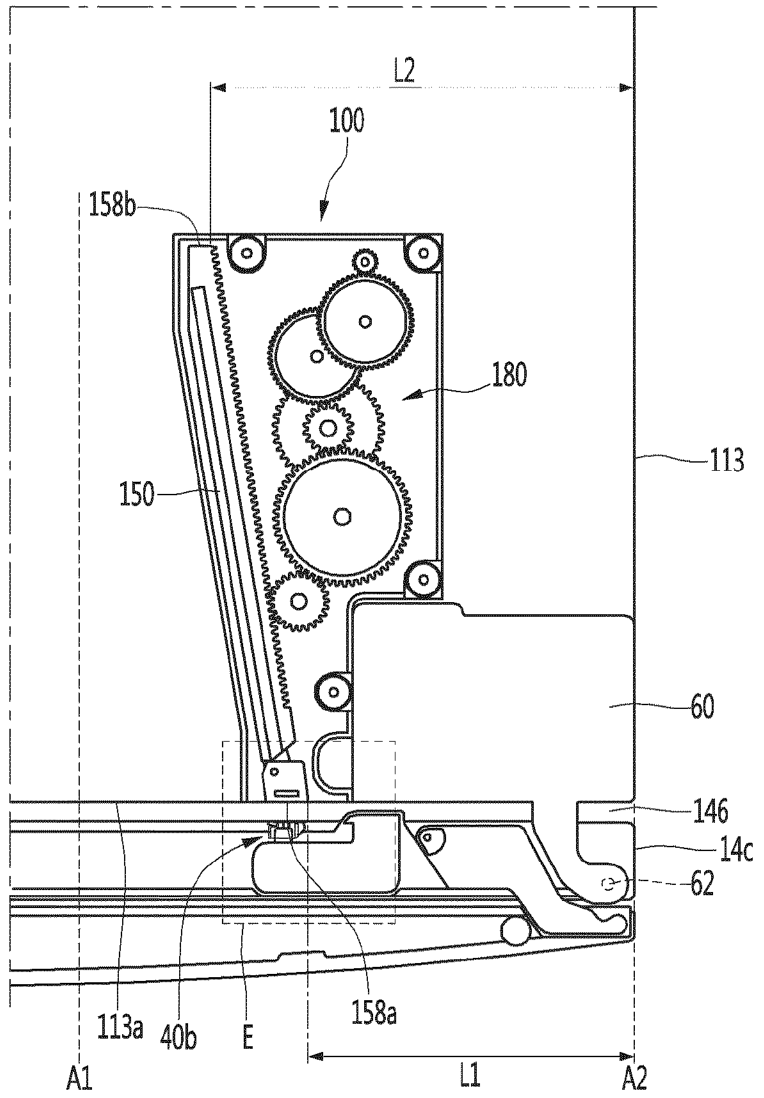
FIG. 10 is an enlarged view of a portion C of FIG. 9.
Figure 11:
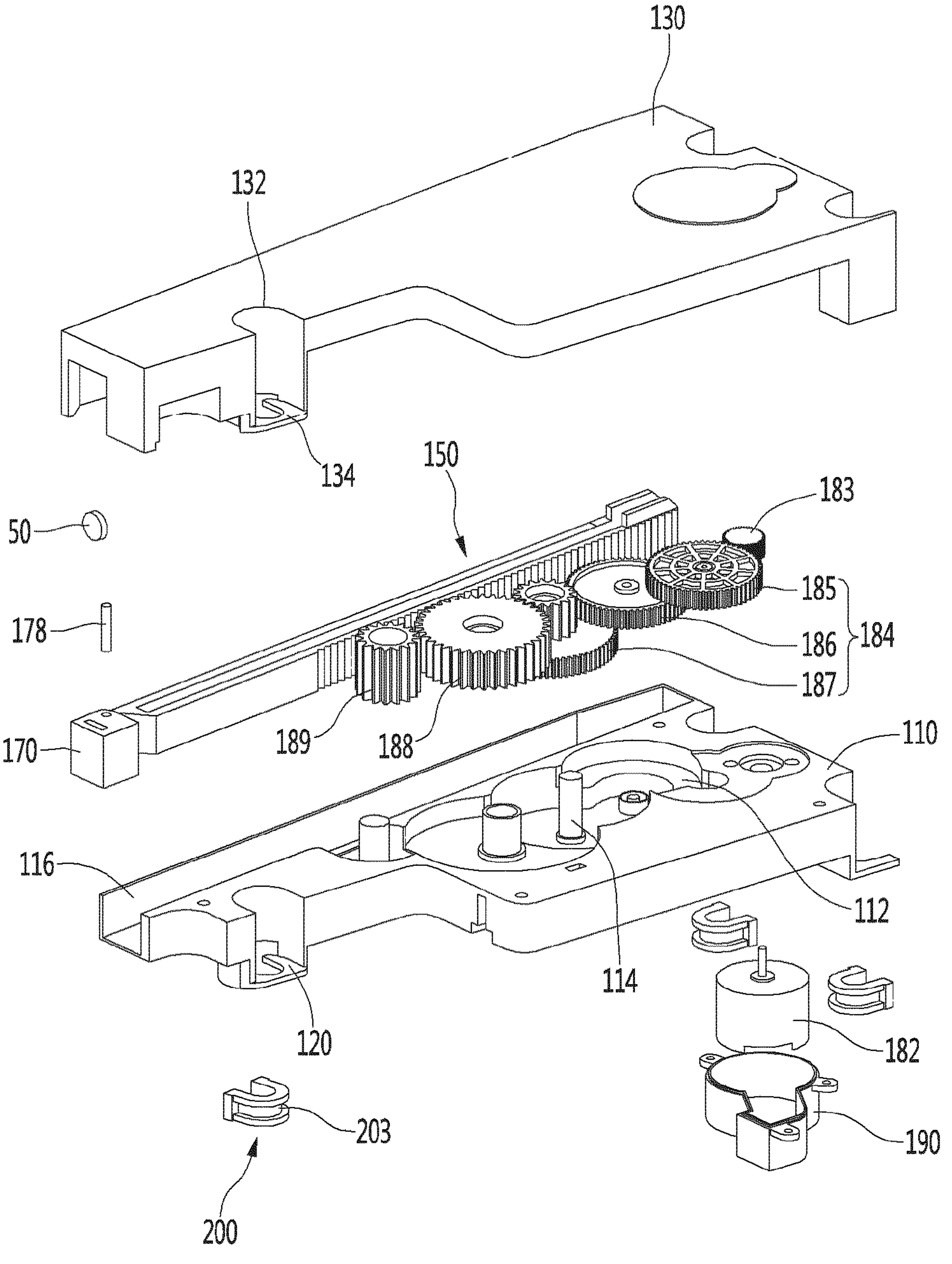
FIG. 11 is an exploded perspective view of a door opening device according to the third embodiment of the present invention.

FIG. 10 is an enlarged view of a portion C of FIG. 9, and FIG. 11 is an exploded perspective view of the door opening device according to the third embodiment of the present invention.

Referring to FIGS. 9 to 11, the door opening device 100 is disposed in an upper portion of the cabinet 11*a*.

The door opening device 100 may include a push member 150 that pushes the door 14*a* to open the door 14*a*.

In FIG. 10, a position of the push member 150 may be referred to as an initial position. However, in this specification, the position of the push member 150 when the opening of the door 14*a* is completed by the push member 150 may be referred to as a door opening position.

Since the door opening device 100 is disposed in the cabinet 11*a*, the push member 150 may increase in length when compared to a case in which the door opening device 100 is disposed in the door 14*a*. When the push member 150 increase in length, an opening angle of the door 14*a* may increase.

The push member 150 may be disposed to be inclined with respect to a first virtual line A1 that is perpendicular to the front surface 113*a* of the cabinet 11*a* and extends forward and backward.

The push member 150 may include a first end portion 158*a* and a second end portion 158*b*.

The first end portion 158*a* is an end portion of the push member 150, which is disposed close to the front surface 113*a* of the cabinet 11*a* (or a boundary 146 between the cabinet 11*a* and the door 14*a*), and the second end portion 158*b* is an end portion disposed at a side opposite to the first end portion 158*a*.

A length from the first end portion 158*a* to the second end portion 158*b* of the push member 150 may be greater than a thickness of the door 14*a* (a thickness in an extension direction of the first virtual line A1 or a second virtual line A2 to be described later).

When the length of the push member 150 is greater than the thickness of the door 14*a*, the opening angle of the door 14*a* may increase.

In this embodiment, the first end portion 158*a* of the push member 150 is disposed close to a sidewall 113 of the cabinet 11*a* (or referred to as a "cabinet sidewall") that is adjacent to a portion at which the first hinge 60 is installed or the second virtual line A2 when compared to the second end portion 158*b* so that the opening angle of the door 14*a* per unit length of the push member 150 increases.

Here, the second virtual line A2 is a virtual line that extends from the sidewall 113 of the cabinet 11*a* and is parallel to the first virtual line A.

The second virtual line A2 may be parallel to the door sidewall 14*c* disposed close to the portion of the door 14*a* at which the first hinge 60 is installed or may be disposed on the door sidewall 14*c*.

In the closed state of the door 14*a* or the initial position of the push member 150, the push member 150 is disposed so that a horizontal distance L1 between the first end portion 158*a* and the sidewall 113 of the cabinet 11*a* is less than a horizontal length L2 between the second end portion 158*b* and the sidewall 113 of the cabinet 11*a*.

In this embodiment, the horizontal distance represents a distance in the normal direction of the sidewall 113.

The opening angle of the door 14*a* per unit length of the push member 150 may increase due to the above-described arrangement of the push member 150. Therefore, there is an advantage that the length of the push member 150 required to open the door 14*a* at a predetermined angle may be reduced.

Also, the first end portion 158*a* may be disposed adjacent to a first side surface among the first side surface disposed close to the first hinge 60 and a second side surface opposite to the first side surface of both sides of the door 14*a*.

The door opening device 100 may further include a driving device 180.

The driving device 180 may further include a driving motor 182 that drives the push member 150, and a power transmission part that transmits power of the driving motor 182 to the push member 150.

The power transmission part may include, but not limited to, a plurality of gears.

The power transmission part includes a driving gear 183 connected to a shaft of the driving motor 182, a reduction gear 184 connected to the driving gear 183, a transmission gear connected to the reduction gear 184, and a driven gear 189 connected to the transmission gear 188 to transmit the power to the push member 150.

Referring to FIG. 9, force required by the user to directly open the door 14*a* is F1. In FIG. 9, a portion at which the force F1 acts is a handle.

Force required by the push member 150 to push and open the door 14*a* is F2.

Here, since the push member 150 is disposed closer to the hinge shaft 62 than the handle, the force F2 is greater than the force F1.

That is, the user has to push the push member 150 with force greater than the required force so as to directly open the door 14*a*.

The more the push member 150 approaches the hinge shaft 62, the more the force required by the push member 150 to open the door 14*a* increases.

Therefore, in this embodiment, the reduction unit 184 may include a plurality of reduction gears 185, 186, and 187 so that the force transmitted to the push member 150 increases when the driving motor 182 operates.

The push member 150 may include a push rack 151 having a rack gear 153 that receives the power of the driving motor 182.

The rack gear 153 may be engaged with the driven gear 189. The driven gear 189 may have a height greater than that of the rack gear 153 so that rotational force of the driven gear 189 is smoothly transmitted to the rack gear 153.

The push rack 151 may include a first side surface 152*a* disposed close to the sidewall 113 of the cabinet 11*a* and a second side surface 152*b* disposed opposite to the first side surface 152*a*. The rack gear 153 may be disposed on the first side surface 152*a*.

When the rack gear 153 is disposed on the first side surface 152*a* like this embodiment, when the push member 150 protrudes forward from the cabinet 11*a* to open the door 14*a*, exposure of the rack gear toward the user may be prevented.

For example, when the door 14*a* is the right door among the doors arranged at the left and rights, the user may stand close to the left door so as not to collide with the right door when the right door is opened.

In this case, when the push member 150 protrudes forward from the cabinet 11*a* while the right door is opened, the user faces the second side surface 152*b* of the push member 150.

In this embodiment, since the rack gear 153 is disposed on the first side surface 152*a* of the push member 150, even if the push member 150 protrudes forward from the cabinet 11*a*, the rack gear 153 may not be visible to the user.

The push member 150 may further include a rack cover 170 coupled to an end portion of the push rack 151.

The rack cover 170 may directly contact the door 14*a*. The rack cover 170 may be made of a material such as urethane rubber or a silicon material.

Accordingly, the first end portion 158*a* of the push member 150 described above may actually be the end portion (contact surface 171 to be described later) of the rack cover 170.

The door opening device 100 may further include a housing that accommodates the push member 150 and guides the movement of the push member 150.

The housing may include, but is not limited to, an upper housing 130 and a lower housing 110.

The power transmission part may be disposed in a space defined by the upper housing 130 and the lower housing 110, and the driving motor 182 may be connected to the driving gear 183 outside the housing.

The lower housing 110 may have a seating part 112 on which the power transmission part is seated. A shaft 114 on which the plurality of gears constituting the power transmission part are rotatably installed may be disposed on the seating part 112.

A guide 116 that guides the movement of the push member 150 may be disposed on each of the upper housing 130 and the lower housing 110.

For example, the driving motor 182 may be installed in the lower housing 110. The motor cover 190 may be coupled to the lower housing 110 so that the motor cover 190 surrounds the driving motor 182 in the state in which the driving motor 182 installed in the lower housing 110.

The door opening device 100 may further include an opening detection part that detects whether the door 14*a* is manually opened.

The opening detection part may include a magnetic field generation device 50 and a reed switch assembly 40*b*.

The magnetic field generation device 50 (e.g., a magnet) may be provided, for example, in the push member 150. The magnetic field generation device 50 may be provided in the rack cover 170, and the reed switch assembly 40*b* may be provided in the door 14*a*.

Since the structure and operation of the reed switch assembly 40*b* are the same as those described in the second embodiment, detailed description thereof will be omitted.

A vibration-proof member 200 may be coupled to the housing. Fixing parts 120 and 134 coupled to the vibration-proof member 200 may be disposed on one or more of the lower housing 110 and the upper housing 130.

FIG. 11, for example, the fixing parts 120 and 134 are respectively provided on the lower housing 110 and the upper housing 130. In this case, the vibration-proof member 200 may be coupled to the fixing parts 120 and 134 of each of the lower housing 110 and the upper housing 130.

A structure of the vibration-proof member 200 and a method for coupling the vibration-proof member 200 to the housing will be described later.

Figure 12:
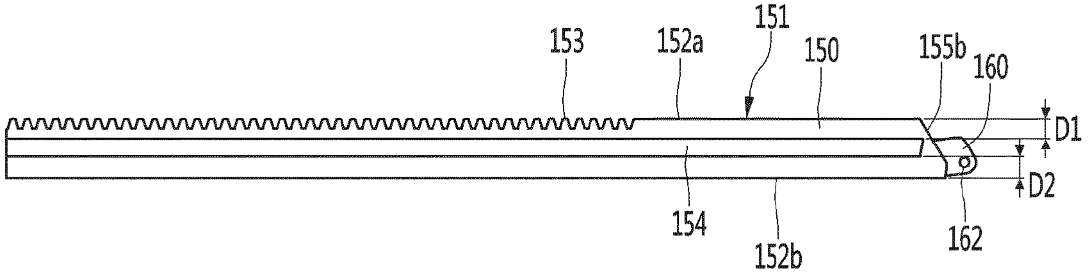
FIG. 12 is a plan view of a push rack according to the third embodiment of the present invention.
Figure 13:
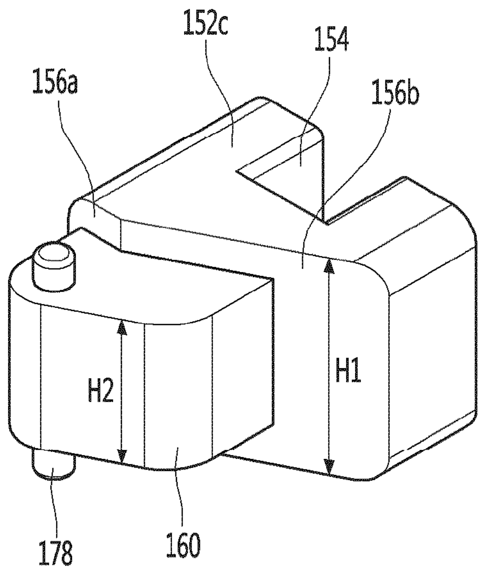
FIG. 13 is a view of a cover coupling part provided on the push rack according to the third embodiment of the present invention.
Figure 14:
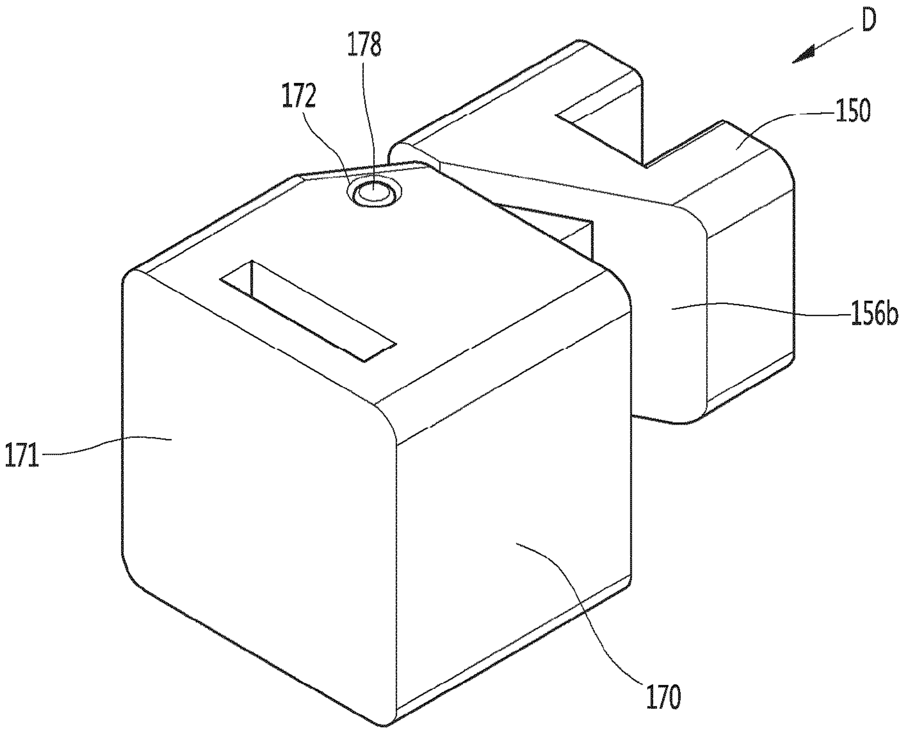
FIG. 14 is a view illustrating a state in which a rack cover is coupled to the cover coupling part of FIG. 12.
Figure 15:
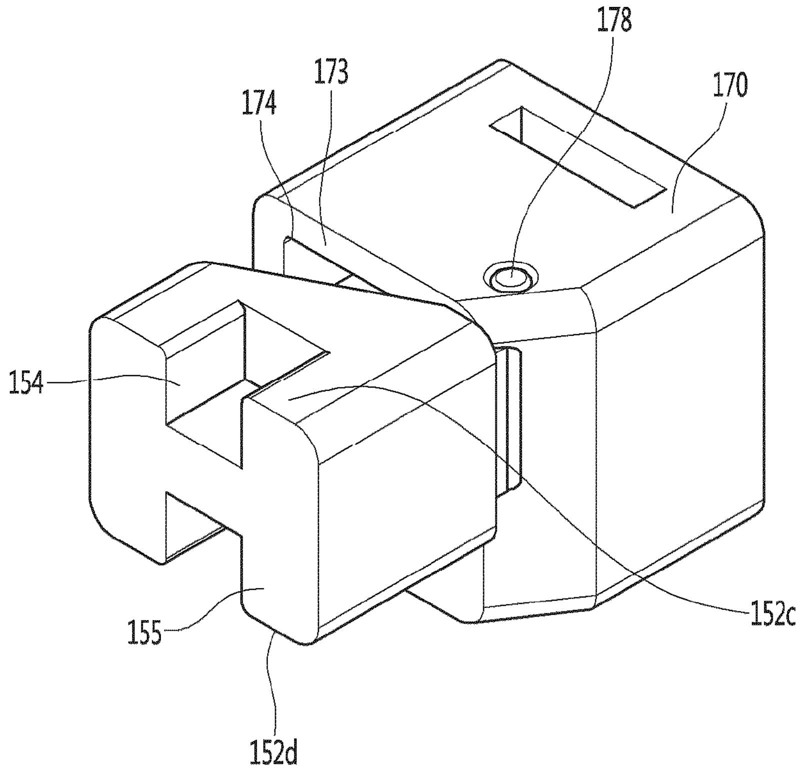
FIG. 15 is a view illustrating constituents of FIG. 14 when viewed in a direction D.

FIG. 12 is a plan view of the push rack according to the third embodiment of the present invention, FIG. 13 is a view of a cover coupling part provided on the push rack according to the third embodiment of the present invention, FIG. 14 is a view illustrating a state in which the rack cover is coupled to the cover coupling part of FIG. 12, and FIG. 15 is a view illustrating constituents of FIG. 14 when viewed in a direction D.

Referring to FIGS. 12 to 15, the push rack 151 may include a top surface 152*c* and a bottom surface 152*d*.

A protrusion or groove that enhances strength of the push rack may be disposed on/in one or more of the top surface 152*c* and the bottom surface 152*d*.

In FIGS. 13 to 15, for example, the groove is defined in each of the top surface 152*c* and the bottom surface 152*d* of the push rack 151.

That is, a top surface groove 154 recessed downward may be defined in the top surface 152*c* of the push rack 151, and a bottom surface groove 155 recessed upward may be defined in the bottom surface 152*d* of the push rack 151.

Although not limited, the top surface groove 154 and the bottom surface groove 155 may be lengthily provided in a longitudinal direction of the push rack 151.

Here, the top surface groove 154 and the bottom surface groove 155 may be disposed to overlap each other in the vertical direction. Therefore, the vertical cross-section of the push rack 151 may have a shape such as "H".

Since a portion at which the rack gear 153 is disposed receives force of the power transmission part, the top surface groove 154 and the bottom surface groove 155 may be defined closer to the first side surface 152*a* than the second side surface 152*b* of the push rack 151 so that strength of the portion at which the rack gear 153 is disposed increases.

That is, a distance D1 between the top surface groove 154 and the first side surface 152*a* is less than a distance D2 between the top surface groove 154 and the second side surface 152*b*. A distance D1 between the bottom surface groove 155 and the first side surface 152*a* is less than a distance D2 between the bottom surface groove 155 and the second side surface 152*b*.

The push rack 151 may further include a connection surface 156*a* connecting one end of the first side surface 152*a* to one end of the second side surface 152*b*. The connection surface 156*a* may connect the top surface 152*c* to the bottom surface 152*d* of the push rack 151.

A cover coupling part 160 coupled to the rack cover 170 may be provided on the connection surface 156*a*. The cover coupling part 160 may protrude from the connection surface 156*a*.

A vertical length H2 of the cover coupling part 160 may be less than a vertical length H1 of the push rack 151. For example, the cover coupling part 160 may be disposed to be spaced apart from each of the top surface 152*c* and the bottom surface 152*d* of the push rack 151.

Also, a shaft hole 162 through which the shaft 178 coupled to the rack cover 170 passes may be defined in the cover coupling part 160.

The rack cover 170 may be rotatably coupled to the cover coupling part 160 by the shaft 178.

The rack cover 170 may have substantially a rectangular parallelepiped shape. The rack cover 170 may include a contact surface 171 contacting the door 14*a*.

In the rack cover 170, a slot 174 into which the cover coupling part 160 is inserted may be defined in an opposite surface of the contact surface 171. In this embodiment, the opposite surface of the contact surface 171 in the rack cover 170 may be referred to as a slot surface 173.

Also, a shaft hole 162 through which the shaft coupled to the cover coupling part 160 inserted into the slot 174 passes may be defined in the rack cover 170.

The connection of the push rack 151 may include an inclined surface 156*b* so that the rack cover 170 and the push rack 151 are rotatable without interfering with each other in the state in which the rack cover 170 is coupled to the cover coupling part 160.

Specifically, in a state in which the initial position of the push member 150 and the contact surface 171 of the rack cover 170 are disposed to face the door 14*a*, at least a portion of the connection surface 156*a* is disposed to be inclined on the rack cover 170 with respect to the slot surface 173.

Thus, the inclined surface 156*b* is spaced apart from the slot surface 173 on the connection surface 156*a*, and a gap is defined between the inclined surface 156*b* and the slot surface 173.

The shaft hole 162 may be disposed close to one side surface of both side surfaces of the rack cover 170.

Referring to FIG. 14, one side surface of the rack cover 170 is a left surface. The inclined surface 156*b* of the connection surface 156*a* may be inclined away from the slot surface 173 from the left surface to the right surface of the rack cover 170.

In this embodiment, since the rack cover 170 contacts the door 14*a*, a surface of the door 14*a* may be prevented from being damaged by the push rack 151.

Figure 16:
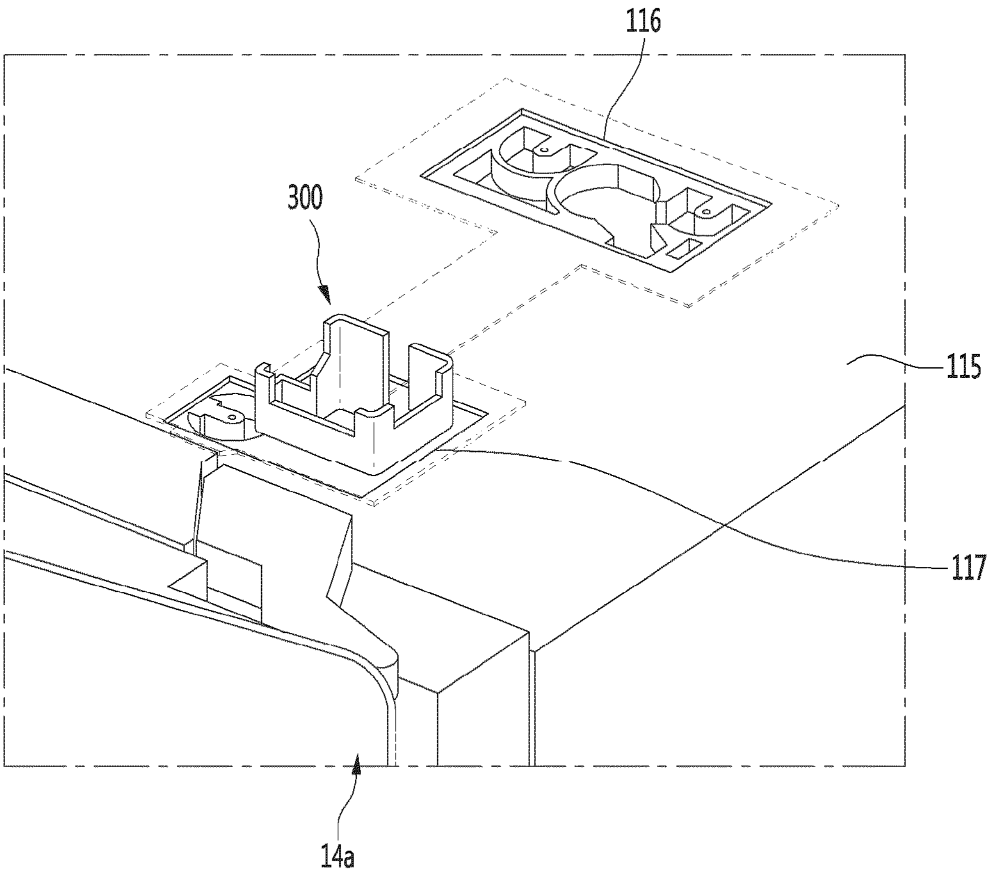
FIG. 16 is a view illustrating a state in which an installation bracket is installed on the cabinet according to the third embodiment of the present invention.
Figure 17:
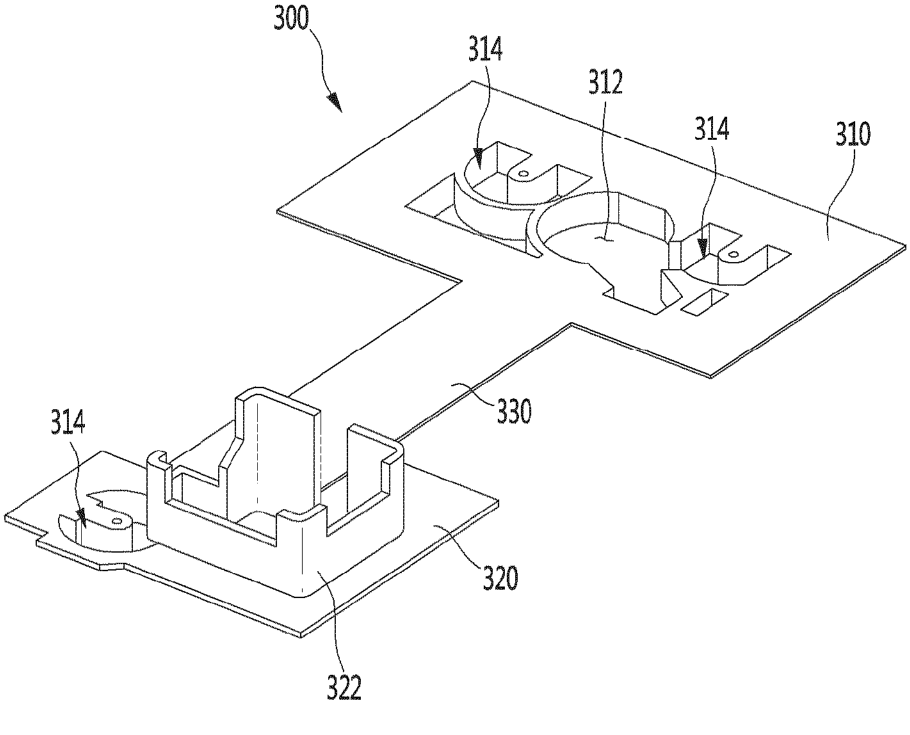
FIGS. 17 and 18 are perspective views of the installation bracket according to the third embodiment of the present invention.
Figure 18:
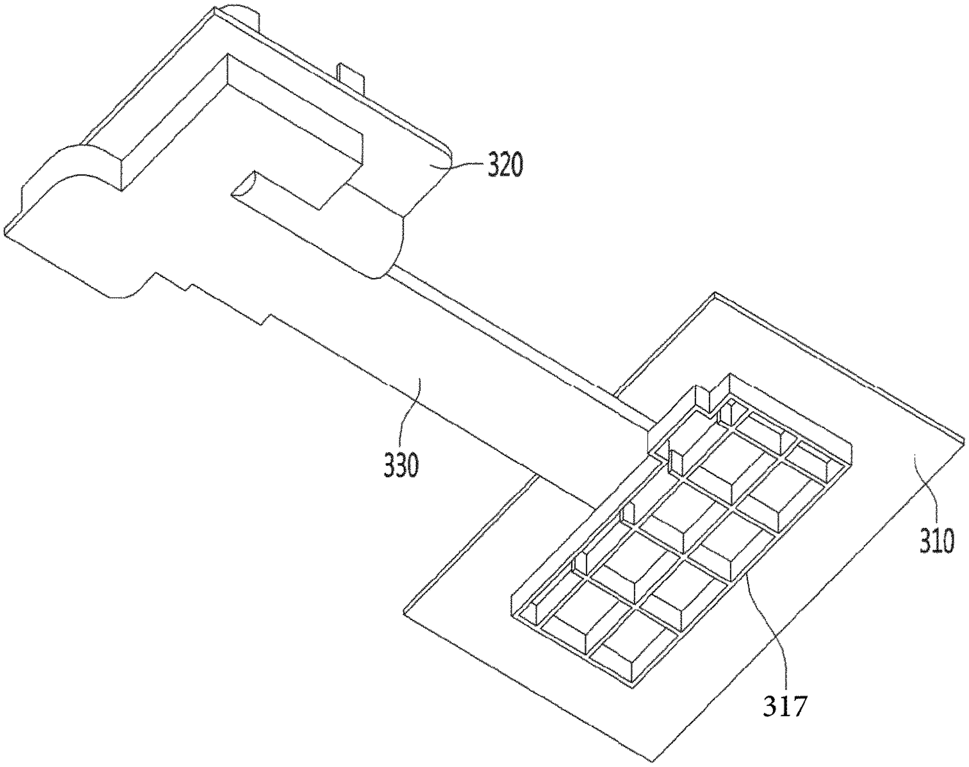

FIG. 16 is a view illustrating a state in which an installation bracket is installed on the cabinet according to the third embodiment of the present invention, and FIGS. 17 and 18 are perspective views of the installation bracket according to the third embodiment of the present invention.

Figure 19:
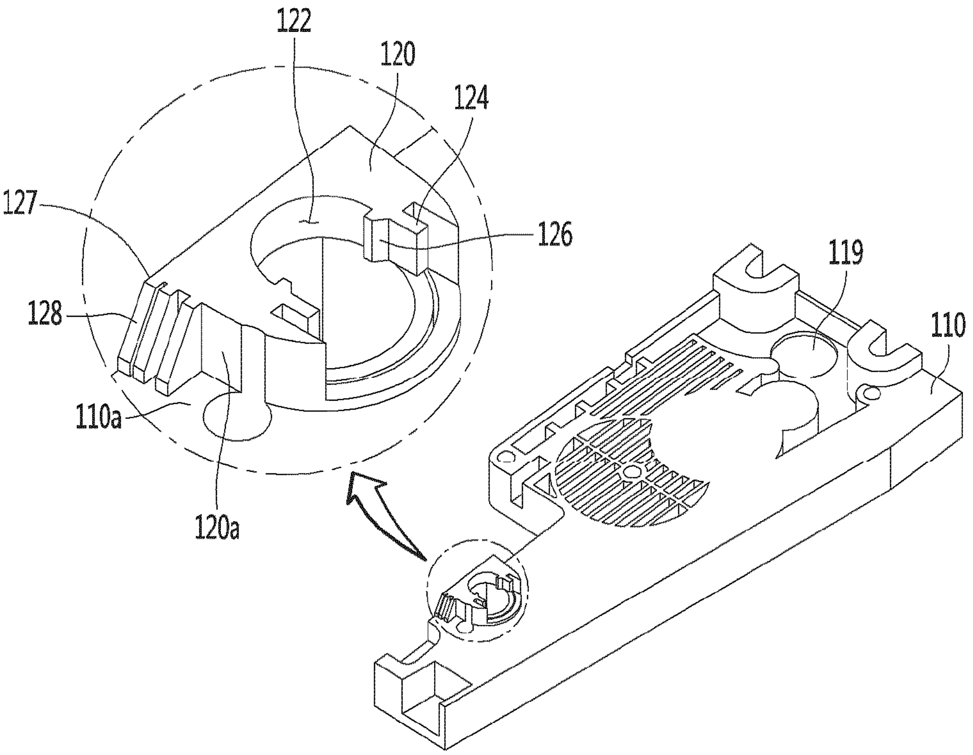
FIG. 19 is a view illustrating a fixing part of a lower housing according to the third embodiment of the present invention.
Figure 20:
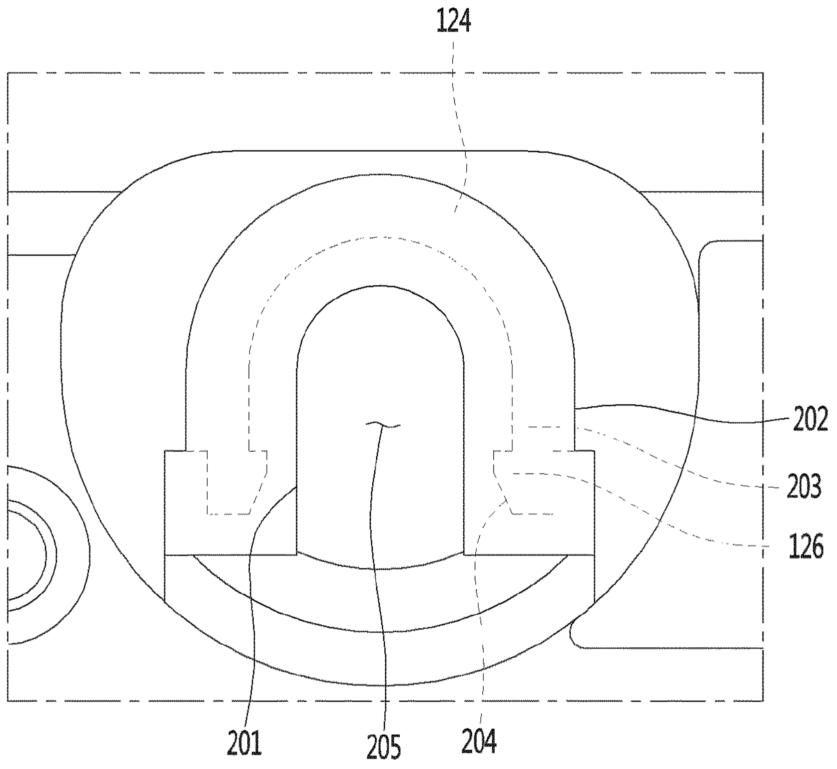
FIG. 20 is a view illustrating a state in which a vibration-proof member is fixed to the fixing part.
Figure 21:
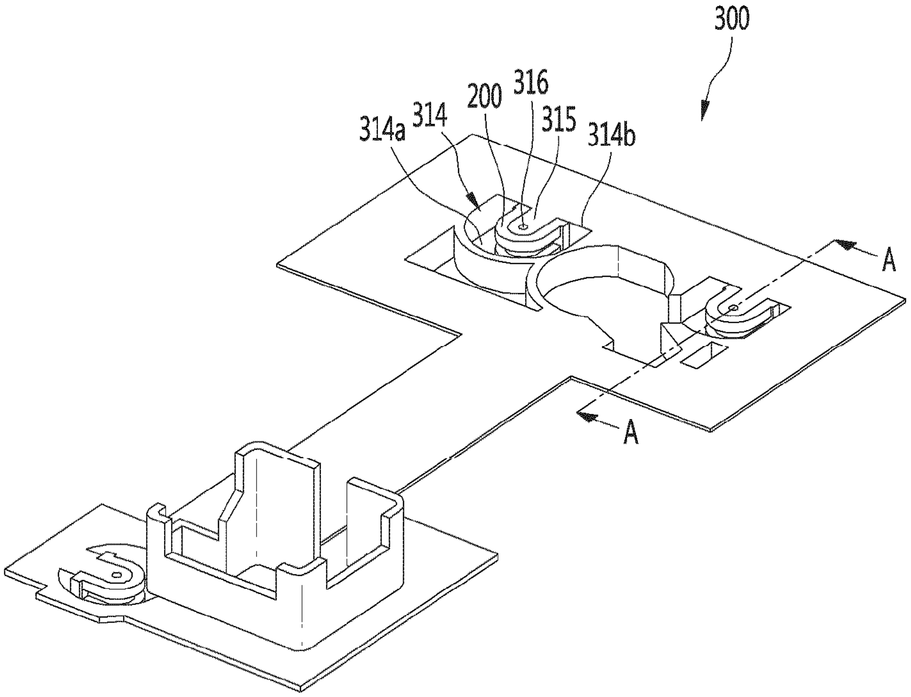
FIG. 21 is a view illustrating a state in which the vibration-proof member is coupled to a coupling protrusion of the installation bracket.
Figure 22:
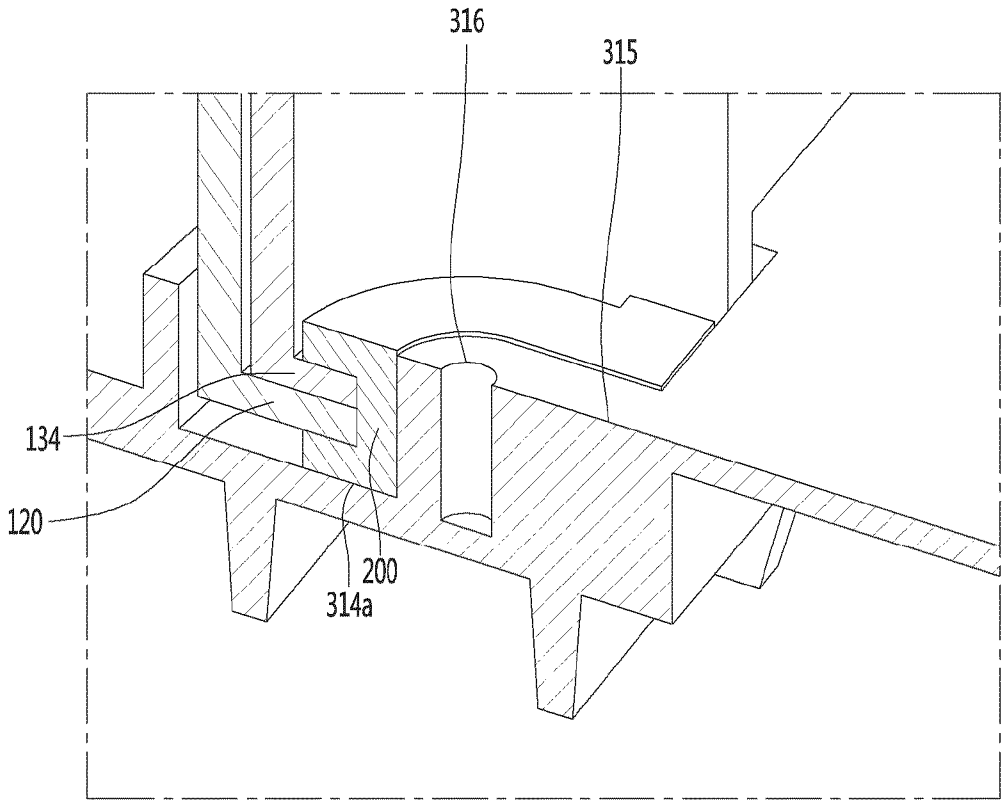
FIG. 22 is a sectional view taken along line A-A of FIG. 21.

FIG. 19 is a view illustrating the fixing part of the lower housing according to the third embodiment of the present invention, FIG. 20 is a view illustrating a state in which the vibration-proof member is fixed to the fixing part, FIG. 21 is a view illustrating a state in which the vibration-proof member is coupled to a coupling protrusion of the installation bracket, and FIG. 22 is a sectional view taken along line A-A of FIG. 21.

Referring to FIGS. 10 and 16 to 22, the door opening device 100 according to this embodiment may be installed in an installation bracket 300 installed in the cabinet 11*a* in the upper portion of the cabinet 11*a*.

The cabinet 11*a* may include an outer case defining an outer appearance, an inner case disposed inside the outer case to define the storage chamber, and a heat insulation material disposed between the inner case and the outer case.

The installation bracket 300 may be fixed to the outer case inside the outer case. In this embodiment, a top surface of the outer case will be described as an upper wall 115 of the cabinet 11*a*.

For example, the installation bracket 300 may be attached to a bottom surface of the upper wall 115 of the cabinet 11*a* by a coupling part such as an adhesive or a tape. That is, the installation bracket 300 may contact the outer case in a space between the outer case and the inner case.

In the state in which the installation bracket 300 is fixed to the outer case, a foaming solution for forming an insulation material may be filled into the space between the outer case and the inner case.

The adhesion between the installation bracket 300 and the outer case may be improved by the expansion of the foaming solution in a process of cooling the foaming solution.

According to this embodiment, the installation bracket 300 may be coupled to the outer case, and then, the door opening device 100 may be installed on the installation bracket 300 without directly providing a structure that couples the door opening device 100 to the outer case.

Thus, there is an advantage in that the position of the door opening device 100 is fixed to the upper portion of the cabinet 11*a* without changing the conventional mold structure for manufacturing the outer case.

Also, there is an advantage in that a structure of a foaming jig holding the outer case to fill the foaming solution into the outer case is used as it is without being changed in structure.

The installation bracket 300 may include a first bracket 310, a second bracket 320 spaced apart from the first bracket 310, and a connection part 330 connecting the first bracket 310 to the second bracket 320.

One or more of the first bracket 310 and the second bracket 330 may include one or more installation parts 314 for installing the door opening device 100.

Each of the first bracket 310 and the second bracket 320 may include one or more installation parts 314 to firmly fix the position of the door opening device 100.

The first bracket 310 may further include a motor accommodation part 312 in which the driving motor 182 generating power for driving the push member 150 is accommodated.

For example, the motor accommodation part 312 may be provided by recessing one surface of the first bracket 310 downward.

In the first bracket 310, the installation part 314 may include a recess part defined by recessing the one surface of the first bracket 310 downward.

For example, the installation part 314 may include a bottom surface 314*a* and a circumferential surface 314*b*.

A coupling protrusion 315 to which the vibration-proof member 200 coupled to the door opening device 100 is coupled may be disposed on the bottom surface 314*a* of the installation part 312.

The coupling protrusion 315 protrudes upward from the bottom surface 314*a* and is connected to the circumferential surface 314*b*. For example, the coupling protrusion 315 is integrated with the bottom surface 314*a* and the circumferential surface 314*b*.

According to this embodiment, since the coupling protrusion 315 is integrated with the circumferential surface 314*b* and the bottom surface 314*a*, a phenomenon in which the coupling protrusion 315 is damaged by reaction force applied to the push member 150 may be prevented.

A coupling groove 316 to which the coupling member is coupled may be defined in the coupling protrusion 315.

Although not limited, the plurality of installation parts 314 may be provided on the first bracket 310, and the motor accommodation part 312 may be disposed between the plurality of installation parts 314.

A rib 317 for reinforcing strength may be disposed on the bottom surface of the first bracket 310. The rib 317 may prevent the first bracket 310 from being deformed by the force applied to the first bracket 310 when the foaming solution is expanded.

Although not limited, the rib 317 may be provided in a lattice shape on the first bracket 310.

Since the structure of the installation part 314 provided on the second bracket 320 is the same as that of the installation part 314 provided on the first bracket 310, a detailed description thereof will be omitted.

In this embodiment, since the installation part 314 and the motor receiving unit 312 are provided to be recessed downward in the first bracket 310 and the second bracket 320, a protruding height of the door opening device 100 from the upper wall 115 of the cabinet 11*a* may be minimized in the state in which the door opening device 100 is installed on the installation bracket 300.

The installation bracket 300 may further include a wire guide 322 guiding a wire. The wire guide 322 may guide the wire to be inserted into the door 14*a*.

For example, the wire guide 322 may be provided in the second bracket 320. The wire guide 322 may be provided in the form protruding from the second bracket 320.

The installation bracket 300 may be disposed so that the second bracket 322 is disposed closer to the front surface of the cabinet 11*a* (or the door 14*a*) than the first bracket 310.

Also, the wire guide 322 may be disposed closer to the sidewall 113 of the cabinet 11*a* than the installation portion 314 of the second bracket 320.

Thus, at the initial position of the push member 150, the wire guide 322 may be disposed in a region between the first side surface 152*a* of the push rack 151 and the sidewall 113 of the cabinet 11*a*.

In order to prevent ween the wire guide 322 and the driving device 180 from interfering with each other, the wire guide 322 and the driving device 180 may be arranged in a front and rear direction.

Here, the wire guide 322 may be disposed in front of the driving device 180.

The driving device 180 may be disposed in a region between the first side surface 152*a* of the push rack 151 and the sidewall 113 of the cabinet 11*a* so that the power is smoothly transmitted to the rack gear 153 disposed on the first side surface 152*a* of the push rack 151.

Since the installation bracket 300 is disposed below the upper wall 115 of the cabinet 11*a*, a plurality of openings may be defined in the upper wall 115 of the cabinet 11*a* so that the door opening device 100 is installed on the installation bracket 300 above the upper wall of the cabinet 11*a*.

The plurality of openings may include a first opening 116 through which the installation part 314 provided on the first bracket 310 and the motor accommodation part 312 are exposed to the outside and a second opening 117 through which the installation part 314 provided on the second bracket 320 and the wire guide 322 are exposed to the outside.

One portion of the vibration-proof member 200 coupled to the door opening device 100 and the driving motor 182 may pass through the first opening 116.

The other portion of the vibration-proof member 200 coupled to the door opening device 100 may pass through the second opening 117. Also, the wire guide 322 may protrude upward from the upper wall 115 through the second opening 117. The wire guide 322 protruding upward from the upper wall 115 may be covered by the first hinge 60.

As described above, the fixing part 120 and 134 having the same structure may be disposed on the lower housing 110 and the upper housing 130, respectively.

Hereinafter, the structure of the fixing part 120 provided on the lower housing 110 will be described.

The fixing part 120 may protrude downward from the bottom surface 110*a* of the lower housing 110. This is done for a reason in which the vibration-proof member 200 coupled to the fixing part 120 passes through the openings 116 and 117 of the cabinet 11*a* so as to be installed on the installation part 314.

The fixing part 120 includes a space part 122 in which the vibration-proof member 200 is disposed and a fixed rib 124 which is exposed to the space part 122 and to which the vibration-proof member 200 is fixed.

Although not limited, the fixing rib 124 may be provided in a shape such as "U" when viewed from above.

The vibration-proof member 200 may be made of a material capable of absorbing vibration. For example, the vibration-proof member 2000 may be made of a rubber material.

The vibration-proof member 200 may be provided, for example, in a shape such as "U". That is, when the vibration-proof member 200 is viewed from above, one side thereof may be opened.

The vibration-proof member 200 may include an inner circumferential surface 201 and an outer circumferential surface 202. A slot 203 into which the fixing rib 124 is accommodated may be defined in the outer circumferential surface 202 of the vibration-proof member 200.

Thus, the vibration-proof member 200 may be slidably coupled to the fixing rib 124 so that the fixing rib 124 is fitted into the slot 203 of the vibration-proof member 200.

A coupling hook 126 may be disposed on the fixing rib 124 to prevent the vibration-proof member 200 from being separated from the fixing rib 124 in the state in which the fixing rib 124 is fitted into the slot 203 of the vibration-proof member 200. A hook insertion part 204 into which the coupling hook 126 is inserted may be defined in the vibration-proof member 200.

For example, the hook insertion part 204 may be recessed toward the inner circumferential surface 201 in the slot 203.

Since the vibration-proof member 200 is provided in a "U" shape, the inner circumferential surface 201 of the vibration-proof member 200 defines a space 205 in which the coupling protrusion 315 is accommodated.

The housing may be installed on the installation bracket 300 in the state in which the vibration-proof member 200 is coupled to the fixing parts 120 and 134 of the housing.

In the process of opening the door 14*a* by the push member 150, the reaction force acts on the push member 150 from the door 14*a*, and the reaction force acting as the push member 150 is transmitted to the housing.

Here, the reaction force acting on the fixing part 120 or 134, which is disposed closest to the door 14*a*, among the fixing parts 120 and 134 provided on the housing may be largest.

Thus, the housing may further include a reinforcement rib 127 integrated with a portion of the whole of the fixing parts 120 and 134. For example, the reinforcement rib 127 may be integrated with the side surface 120*a* of the fixing part 120 and the bottom surface 110*a* of the lower housing 110. The reinforcement rib 127 may include an inclined surface 128 so as not to interfere with surrounding structures.

A motor accommodating groove 119 accommodating the driving motor 182 may be defined in a bottom surface of the lower housing 110. The motor cover 190 may be coupled to the lower housing 110 in the state in which the driving motor 182 is accommodated in the motor accommodating groove 119.

A process of installing the door opening device 100 on the installation bracket 300 will be described.

The coupling protrusion 315 of the installation bracket 300 and the vibration-proof member 200 of the door opening device 100 are aligned, and then, the door opening device 100 moves toward the upper wall 115 of the cabinet 11*a* so that the coupling protrusion 315 is fitted into the vibration-proof member 200.

The coupling protrusion 315 is fitted into the space 205 of the vibration-proof member 200, and the vibration-proof member 200 is seated on the bottom surface 314*a* of the installation part 314.

The housing is spaced apart from the bottom surface 314*a* in the state in which the vibration-proof member 200 is seated on the bottom surface 314*a* of the installation part 314.

The coupling member may be coupled to the coupling protrusion 315 in the state in which the coupling protrusion 315 is fitted to the vibration-proof member 200.

Hereinafter, an operation of the door opening device will be described.

Figure 23:
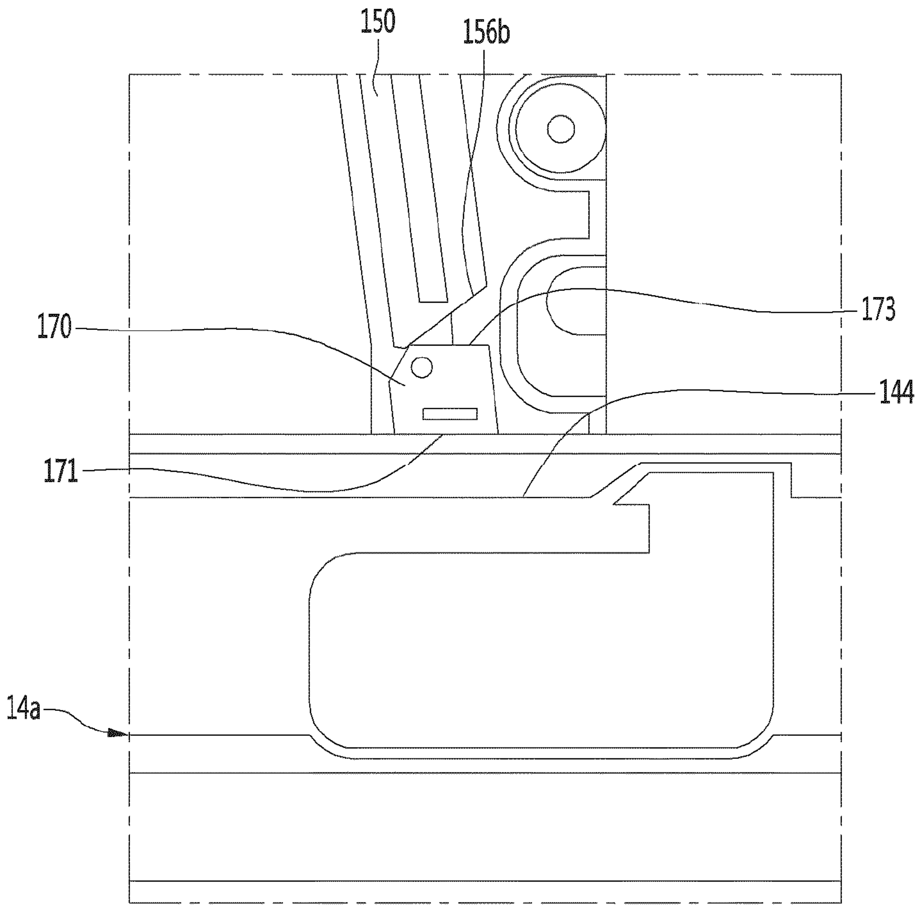
FIG. 23 is an enlarged view illustrating a portion E of FIG. 11.
Figure 24:
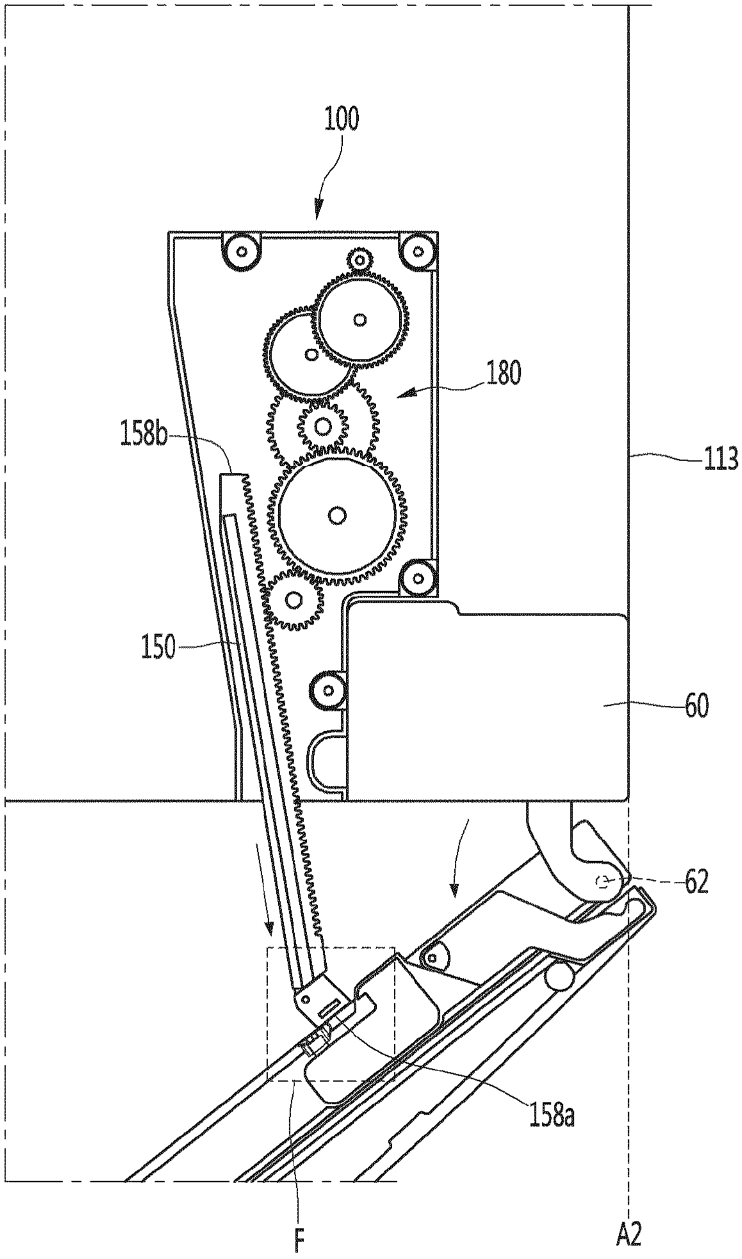
FIG. 24 is a view illustrating a state in which a refrigerator door is opened by the door opening device according to the third embodiment of the present invention.
Figure 25:
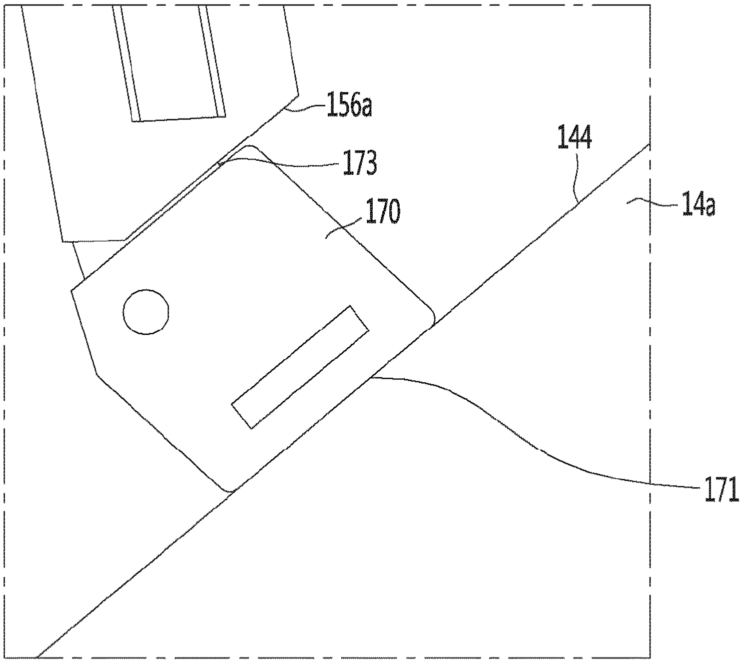
FIG. 25 is an enlarged view of a portion F of FIG. 24.

FIG. 23 is an enlarged view illustrating a portion E of FIG. 11, FIG. 24 is a view illustrating a state in which the refrigerator door is opened by the door opening device according to the third embodiment of the present invention, and FIG. 25 is an enlarged view of a portion F of FIG. 24.

Referring to FIGS. 8 to 24, when the refrigerator 10 is turned on, a controller (not shown) waits for an input of a door opening command.

At the initial position of the push member 150, the rack cover 170 is spaced apart from a surface 144 of the door 14*a* (a surface facing the front surface 113*a* of the cabinet 11*a*, i.e., referred to as a rear surface of the door), and the contact surface 171 of the rack cover 170 is disposed to face the door 14*a*.

If it is determined that the door opening command is inputted, the controller controls the driving motor 182 so that the driving motor 182 rotates in a first direction to allow the push member 150 to move from the initial position to the door opening position.

When the driving motor 182 rotates in the first direction, the power transmission part transmits the rotational force of the driving motor 182 to the push member 150 in the first direction, and thus, the push member 150 pushes the door 14*a* to allow the door 14*a* to rotate.

Since the rack cover 170 is spaced apart from the door 14*a* at the initial position of the push member 150, the rack cover 170 moves together with the push rack 151 at the initial operation of the driving motor 182, and thus, the contact surface 171 of the rack cover 170 contacts the surface 144 of the door 14*a*.

In this state, when the protruding length of the push rack 151 (for example, the length protruding forward from the cabinet 11*a* or the length protruding outward from the housing) increases, the push member 150 may press the surface 144 of the door 14*a* to open the door 14*a*.

In this embodiment, since the rack cover 170 is rotatably coupled to the cover coupling part 160, when the opening angle of the door 14*a* increases in the state in which the push rack 151 protrudes from the housing to allow the contact surface 171 of the rack cover 170 to contact the surface 144 of the door 14*a*, the rack cover 170 relatively rotates with respect to the push rack 151.

Then, the rack cover 170 rotates in a direction in which the slot surface 173 of the rack cover 170 and the inclined surface 156*b* of the connection surface 156*a* approach each other, and the inclined surface 156*b* of the connection surface 156*a* contacts the slot surface 173 of the rack cover 170 in the state in which the door 14*a* is opened at a predetermined angle.

As described above, the contact surface of the rack cover 170 is not slid on the surface 144 of the door 14*a* in the state in which the contact surface 171 of the rack cover 170 contact the door 14*a* until the inclined surface 156*b* of the connection surface 156*a* contacts the slot surface 173 of the rack cover 170.

Accordingly, friction between the rack cover 170 and the surface 144 of the door 14*a* may be minimized to minimize surface damage of the rack cover 170 and/or the door 14*a*.

Also, the first end portion 158*a* and the second end portion 158*b* of the push member 150 move together by the operation of the driving motor 182.

Here, in the process of moving the push member 150 to open the door 14*a*, the first end portion 158*a* and the second end portion 158*b* of the push member 150 move to approach the second virtual line A2.

The controller determines whether the push member 150 reaches the door opening position in the rotation process of the driving motor 182 in the first direction.

The controller may determine whether the push member 150 reaches the door opening position by using a sensor (not shown). Alternatively, the controller may determine that the push member 150 reaches the door opening position when cumulative rpm of the driving motor 182 reaches reference rpm.

The controller may stop the rotation of the driving motor 182 when it is determined that the push member 150 moves to the door opening position.

In a state in which the door 14*a* rotates at a predetermined angle, the user may manually increase the opening angle of the door 14*a*.

On the other hand, when the manual opening of the door 14*a* is detected by the opening detection part in the state in which the driving motor 182 is stopped while the door 14*a* is opened or after the door 14*a* is opened, the controller may allow the driving motor 181 to rotate in a second direction opposite to the first direction so that the push member 150 returns to the initial position.

The controller determines whether a predetermined time is elapsed when the push member 150 moves to the door opening position, and the driving motor 182 is stopped.

If it is determined that a predetermined time is elapsed at a time point at which the driving motor 182 is stopped, the control unit allows the driving motor 182 to rotate in the second direction so that the push member 150 returns to the initial position.

Also, the controller determines whether the push member 150 returns to the initial position, and when it is determined that the push member 150 returns to the initial position, the driving motor 182 is stopped.

In the third embodiment, the door opening device is installed in the cabinet. However, alternatively, the door opening device may be installed in the door. In this case, relationships between the push member and the first and second virtual lines may be the same.

For example, the push member may be disposed to be inclined with respect to the first virtual line perpendicular to the front surface of the cabinet and extending in the front and rear direction.

Also, the push member may include a first end portion and a second end portion. The first end portion is an end portion disposed close to the front surface of the cabinet in the push member, and the second end portion is an end portion disposed opposite to the first end portion.

A length of the first end portion and the second end portion of the push member may be greater than a thickness (in the front and rear direction) of the door.

The first end portion of the push member may be disposed closer to the sidewall 14*c* of the door 14*a* adjacent to the portion at which the first hinge is installed than the second end portion.

That is, in the state in which the door is closed or at the initial position of the push member, the push member may be disposed so that a horizontal distance from the first end portion to the sidewall 14*c* of the door is less than a horizontal distance from the second end portion to the sidewall 14*c* of the door.

In this case, the horizontal distance represents a distance in a normal direction of the sidewall of the door.

The invention claimed is:

1. A refrigerator comprising:
- a cabinet having a storage chamber;
- a door connected to the cabinet and configured to open and close at least a portion of the storage chamber; and
- a door opening device disposed at the cabinet and configured to open the door,
- wherein the cabinet comprises:
  - an outer case comprising an upper wall that defines an opening,
  - an installation bracket that is attached to an inner surface of the outer case and that covers the opening of the upper wall,
  - an inner case that is disposed inside the outer case and that defines the storage chamber, and
  - an insulation material provided in an insulation space that is defined by the outer case and the inner case, and
- wherein the door opening device comprises:
  - a driving motor configured to generate power,
  - a housing comprising a plurality of fixing parts that are mounted to the installation bracket through the opening of the upper wall, the housing defining a guide, and
  - a push member configured to move forward and backward along the guide of the housing by the power from the driving motor.

2. The refrigerator of claim 1, wherein the insulation material is provided into the insulation space in a state in which the installation bracket is attached to the inner surface of the outer case by an adhesive or a tape.

3. The refrigerator of claim 1, wherein the housing comprises an upper housing and a lower housing, and
- wherein each of the plurality of fixing parts is provided at the lower housing and the upper housing.

4. The refrigerator of claim 3, further comprising a vibration-proof member coupled to each of the plurality of fixing parts.

5. The refrigerator of claim 3, wherein the guide is defined at each of the lower housing and the upper housing.

6. The refrigerator of claim 3, wherein the driving motor is connected to the lower housing.

7. The refrigerator of claim 6, wherein the lower housing defines a motor accommodating groove at a bottom surface thereof, and the motor accommodating groove accommodates the driving motor.

8. The refrigerator of claim 7, further comprising a motor cover that surrounds the driving motor in the lower housing.

9. The refrigerator of claim 1, wherein the push member comprises:

a rack gear configured to receive the power from the driving motor;

a cover coupling part disposed at an end of the push member; and a rack cover made of an elastic material and coupled to the cover coupling part.

10. The refrigerator of claim 9, wherein the push member further comprises a magnetic field generation device that is disposed at the rack cover.

11. The refrigerator of claim 1, wherein the installation bracket defines a motor accommodation portion that accommodates the driving motor.

12. The refrigerator of claim 11, wherein the motor accommodation portion is recessed downward from a surface of the installation bracket, and wherein the driving motor is accommodated in the motor accommodation portion after passing through the opening of the upper wall.

13. The refrigerator of claim 3, wherein the installation bracket comprises an installation part, wherein the plurality of fixing parts are mounted to the installation part, wherein the installation part defines a recess that is recessed downward from a surface of the installation bracket, and wherein each of the plurality of fixing parts is received in the recess of the installation part after passing through the opening of the upper wall.

14. The refrigerator of claim 13, wherein the door opening device further comprises a reinforcement rib that is disposed at at least one of (i) a side surface of at least one of the plurality of fixing parts or (ii) a bottom surface of the lower housing, and wherein the reinforcement rib comprises an inclined surface spaced apart from a surrounding structure of the door opening device, and wherein the reinforcement rib is received in the recess of the installation part after passing through the opening of the upper wall.

15. The refrigerator of claim 13, wherein the installation part has a bottom surface and a circumferential surface, and wherein the installation bracket comprises a coupling protrusion that protrudes from at least one of the bottom surface or the circumferential surface and that connects to each of the plurality of fixing parts.

16. The refrigerator of claim 1, wherein the installation bracket comprises a wire guide configured to guide a wire to be inserted into the door.

17. The refrigerator of claim 16, wherein the wire guide protrudes upward from the installation bracket and passes through the opening of the upper wall in a state in which the installation bracket is attached to the inner surface of the outer case.

18. The refrigerator of claim 16, wherein the wire guide and the driving motor are arranged in a front-rear direction of the cabinet.

19. The refrigerator of claim 1, wherein the installation bracket comprises a rib that is disposed at a bottom surface of the installation bracket and that has a lattice shape.

20. The refrigerator of claim 1, wherein the installation bracket comprises:

a first bracket;

a second bracket spaced apart from the first bracket; and a connection part that connects the first bracket to the second bracket, and wherein each of the first bracket and the second bracket comprises at least one of the plurality of fixing parts.

* * * * *